(12) United States Patent
Wakai et al.

(10) Patent No.: US 6,317,823 B1
(45) Date of Patent: Nov. 13, 2001

(54) APPARATUS AND METHOD FOR PROCESSING INFORMATION WITH RECOGNIZING A SITUATION AND MEDIUM STORING PROGRAM THEREFOR

(75) Inventors: Masanori Wakai; Shouichi Ibaraki, both of Tokyo; Masayuki Takayama, Kashiwa; Aruna Rohra Suda, Yokahama; Kenichi Fujii, Yokohama; Suresh Jeyachandran, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/997,791

(22) Filed: Dec. 24, 1997

(30) Foreign Application Priority Data

Dec. 26, 1996 (JP) .................................................... 8-348047
Feb. 28, 1997 (JP) .................................................... 9-044524

(51) Int. Cl.⁷ ...................................................... G06F 7/38
(52) U.S. Cl. .......................... 712/220; 712/200; 714/34; 709/249; 709/250; 358/1.13; 358/1.15
(58) Field of Search ................................ 712/200, 1, 220; 714/34, 35; 709/223, 224, 226, 249, 250; 707/7, 10; 358/1.13, 1.14, 1.15, 1.18

(56) References Cited

U.S. PATENT DOCUMENTS

| | | | |
|---|---|---|---|
| 5,038,392 | * | 8/1991 | Morris et al. ......................... 382/175 |
| 5,282,265 | * | 1/1994 | Suda et al. .............................. 706/11 |
| 5,287,194 | * | 2/1994 | Martin ................................... 358/296 |
| 5,396,341 | * | 3/1995 | Takahashi et al. .................... 358/400 |
| 5,436,730 | | 7/1995 | Hube ..................................... 358/401 |
| 5,627,658 | * | 5/1997 | Connors et al. ...................... 358/407 |
| 5,630,032 | * | 5/1997 | Yamaguchi et al. ................. 395/115 |
| 5,734,328 | * | 3/1998 | Shinbori .......................... 340/825.06 |
| 5,757,958 | * | 5/1998 | Shimizu et al. ...................... 382/181 |
| 5,878,196 | * | 3/1999 | Suzuki ................................. 358/1.15 |
| 5,881,168 | * | 3/1999 | Takaoka et al. ...................... 382/180 |
| 6,157,465 | * | 12/2000 | Suda et al. ............................ 358/407 |

FOREIGN PATENT DOCUMENTS

0656581A1   6/1995   (EP) .
WO9601449A  1/1996   (WO) .

* cited by examiner

*Primary Examiner*—Richard Hjerpe
*Assistant Examiner*—Mackly Monestime
(74) *Attorney, Agent, or Firm*—Fitzpatrick, Cella, Harper & Scinto

(57) ABSTRACT

A computer analyzes a printing instruction received from the user, and recognizes situations, e.g., properties and status, of available printers. When analysis of the printing instruction results in that a process instructed from the user is, for example, to print a colored document and an apparatus instructed to execute the process is a monochromatic printer, and recognition of the situations results in that an available color printer exists, the computer determines that the instructed printing process of the colored document should be instructed to not the monochromatic printer having been instructed, but the color printer, and then issues to the user an inquiry as to whether to print the document using the color printer.

27 Claims, 29 Drawing Sheets

FIG. 13

| TYPE OF JOB | CONDITIONS | YES/NO OF ADVANCE NOTICE |
|---|---|---|
| RECEPTION OF INFORMATION | | NO |
| TRANSMISSION OF INFORMATION | WITHIN ON-DUTY HOURS | YES |
| NORMAL STATUS | | NO |
| ABNORMAL STATUS | | YES |
| ETC. | | YES |

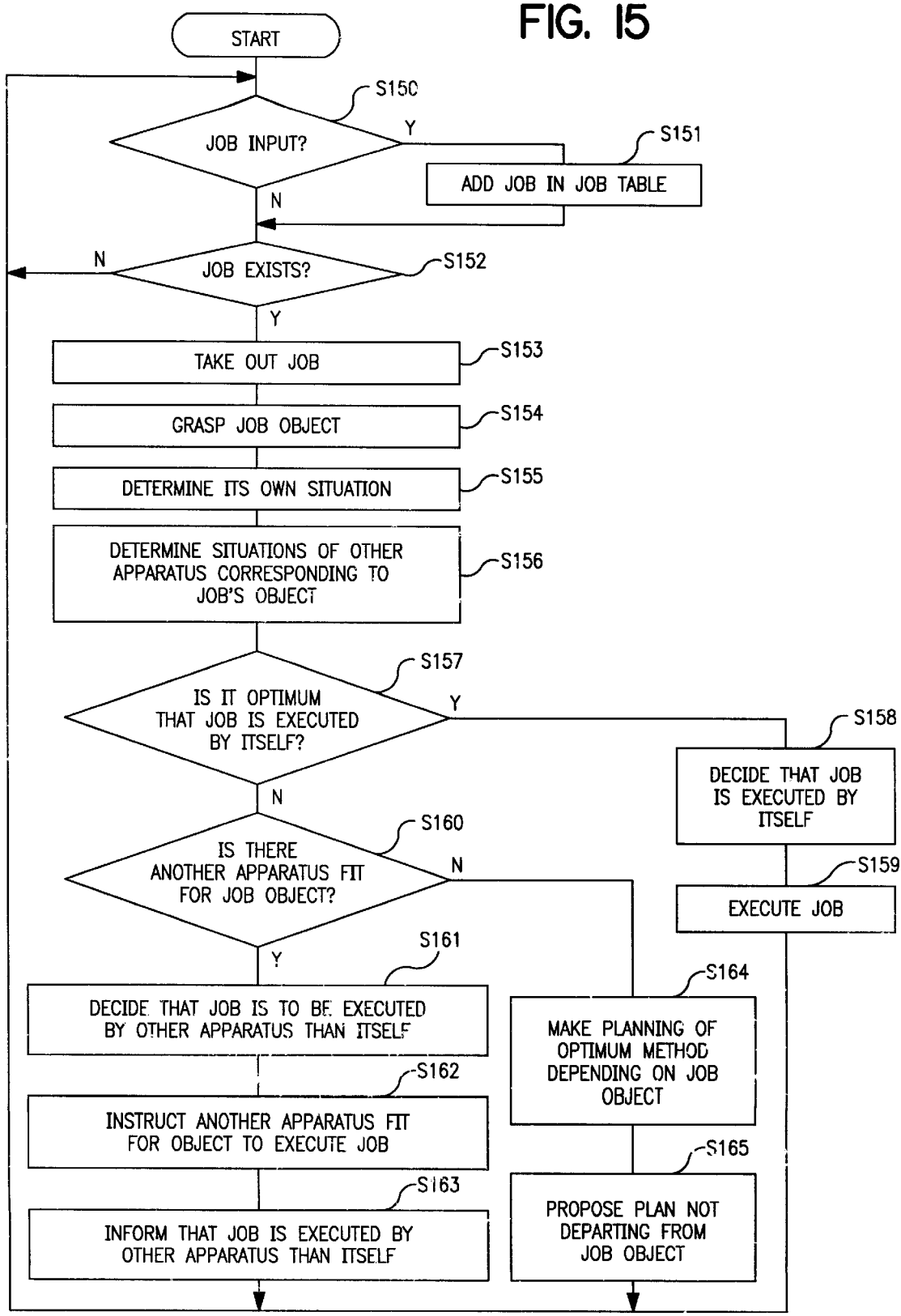

FIG. 17

NOTICE Window

ANY PRINTER AVAILABLE FOR YOU
CANNOT EXECUTE PRINTING.
PLEASE REPLACE TONER CARTRIDGE IN PRINTER
104 OR RESUPPLY SHEETS IN PRINTER 103.

OK    Cancel

| CONDITIONS OF JOB EXECUTION | ITEM OF JOB EXECUTION |
|---|---|
| NO INPUT & NO JOB & POWER-OFF ALLOWED TIME ZONE | TURN OFF POWER |

| CONDITIONS OF JOB EXECUTION | ITEM OF JOB EXECUTION |
|---|---|
| NO CONDITIONS | ANALYZE INPUT |
| NO INPUT & NO JOB & POWER-OFF ALLOWED TIME ZONE | TURN OFF POWER |

PRESENTATION OF NEW PRODUCT
SPORT CAR FFX2

DECEMBER, 1996
NEW MODEL MOUNTING DX ENGINE
FIRST IN THE WORLD EMERGED
ON THE MARKET

PLEASE CONTACT
0120-12345 !

FIG. 24

QUESTION Window

DO YOU MAKE PRINTING BY COLOR PRINTER ?

YES    NO

FIG. 25

| CONDITIONS OF JOB EXECUTION | ITEM OF JOB EXECUTION |
|---|---|
| NO INPUT & ELAPSE OF 10 MINUTES | TAKE ACTION FOR ABSENCE OF RESPONSE FROM USER |
| NO INPUT & NO JOB & POWER-OFF ALLOWED TIME ZONE | TURN OFF POWER |

FIG. 26

| TIME | SCHEDULE | WHERE TO MAKE CONTACT | MATERIAL TO BE USED |
|---|---|---|---|
| 12/5 10:00 ~ 12:00 | MEETING | EXT. 12345 | NONE |
| 12/5 13:00 ~ 15:00 | BUSINESS TALK | 03-3210-9876 | file A |

FIG. 27

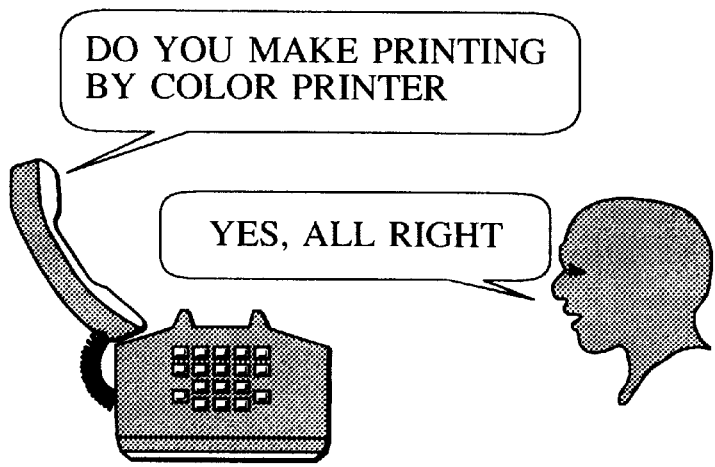

FIG. 28

| CONDITIONS OF JOB EXECUTION | ITEM OF JOB EXECUTION |
|---|---|
| NO INPUT | TAKE ACTION FOR ABSENCE OF RESPONSE FROM USER |
| NO INPUT & NO JOB & POWER-OFF ALLOWED TIME ZONE | TURN OFF POWER |

FIG. 29

| CONDITIONS OF JOB EXECUTION | ITEM OF JOB EXECUTION |
|---|---|
| PRINTER STATUS CHANGED TO OTHER THAN "UNDER PRINTING" | EXECUTE PROCESS CORRESPONDING TO STATUS |
| NO INPUT & NO JOB & POWER-OFF ALLOWED TIME ZONE | TURN OFF POWER |

FIG. 30

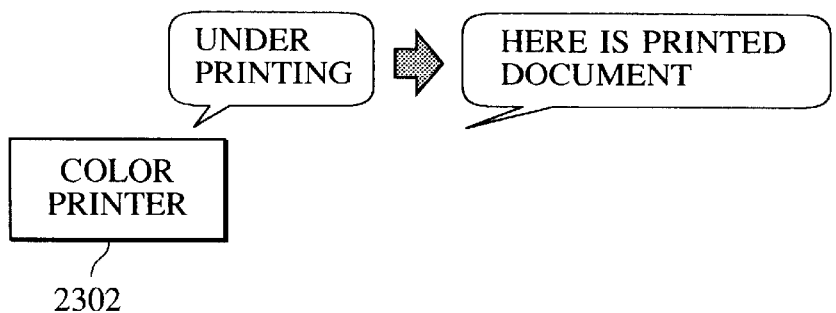

FIG. 31

| PRINTER STATUS | MEANING OF STATUS |
|---|---|
| NORMAL | NORMAL |
| UNDER PRINTING | UNDER PRINTING |
| THERE IS PRINTED DOCUMENT | DOCUMENT PRINTED PREVIOUSLY REMAINS IN TRAY |

FIG. 32

| CONDITIONS OF JOB EXECUTION | ITEM OF JOB EXECUTION |
|---|---|
| PRINTER STATUS CONTINUES IN "HERE IS PRINTED DOCUMENT" & ELAPSE OF 10 MINUTES | TAKE ACTION FOR CASE OF PRINTED DOCUMENT REMAINING |
| NO INPUT & NO JOB & POWER-OFF ALLOWED TIME ZONE | TURN OFF POWER |

FIG. 33
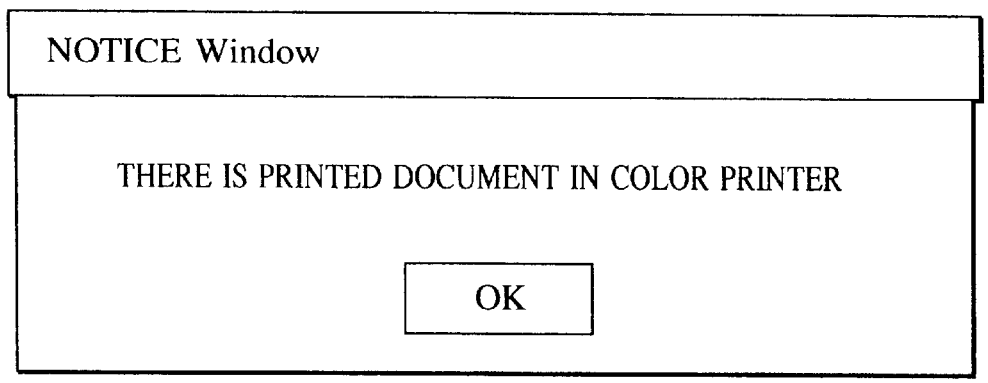
FIG. 34
| CONDITIONS OF JOB EXECUTION | ITEM OF JOB EXECUTION |
|---|---|
| PRINTER STATUS OTHER THAN "HERE IS PRINTED DOCUMENT" | CHECK JOB CORRESPONDING TO "THERE IS PRINTED DOCUMENT" |
| NO INPUT & ELAPSE OF 10 MINUTES | TAKE ACTION FOR ABSENCE OF RESPONSE FROM USER |
| NO INPUT & NO JOB & POWER-OFF ALLOWED TIME ZONE | TURN OFF POWER |
FIG. 35
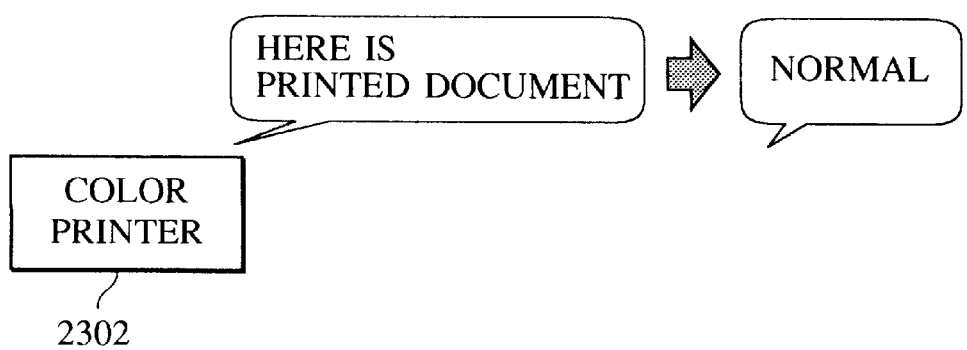

FIG. 36

| USER'S OBJECT | PRECONDITIONS | PLAN & ACTION |
|---|---|---|
| OBTAIN PRINTED DOCUMENT | THERE IS PRINTED DOCUMENT | ① KNOW PLACE WHERE DOCUMENT IS<br>② GO THERE<br>③ OBTAIN PRINTED DOCUMENT |
| THERE IS PRINTED DOCUMENT | THERE IS ORIGINAL DOCUMENT TO BE PRINTED & PRINTING ENVIRONMENT CAPABLE OF PRINTING DOCUMENT WITH SATISFIED REQUIREMENTS | ① INSTRUCT PRINTING |
| OFFER APPROVAL | INQUIRED | ① OFFER APPROVAL WITH VOICE, MOUSE CONTROL, ETC. |
| OFFER OPPOSITION | INQUIRED | ① OFFER OPPOSITION WITH VOICE, MOUSE CONTROL, ETC. |

FIG. 37

| OBJECT OF SYSTEM | PRECONDITIONS | PLAN & ACTION |
|---|---|---|
| ACHIEVE USER'S OBJECT | STABILITY OF SYSTEM | ① GRASP USER'S OBJECT<br>② PLANNING FOR ACHIEVEMENT OF OBJECT<br>③ EXECUTION |
| STABILITY OF SYSTEM | ABNORMAL CONDITION OF SYSTEM | ① RESTORE SYSTEM TO NORMAL CONDITION |
|  | NO JOB UNDER EXECUTION & POWER-OFF ENABLE TIME ZONE | ① TURN OFF POWER |
| GRASP USER'S OBJECT | THERE IS INPUT | ① GRASP INPUT ITEM |
| DELIVER TO PRINTED DOCUMENT TO USER | THERE IS PRINTED DOCUMENT | ① NOTIFY OF WHERE DOCUMENT IS |
| THERE IS PRINTED DOCUMENT | THERE IS ORIGINAL DOCUMENT TO BE PRINTED & PRINTING CONDITIONS ARE CLARIFIED & NORMAL PRINTING ENVIRONMENT | ① SELECT PRINTING ENVIRONMENT<br>② EXECUTE PRINTING |
| THERE IS ORIGINAL DOCUMENT TO BE PRINTED |  | ① PREPARE ORIGINAL DOCUMENT TO BE PRINTED |
| CLARIFY PRINTING CONDITIONS |  | ① MAKE INQUIRY TO USER |
| RESTORE TO NORMAL PRINTING ENVIRONMENT | ABNORMAL CONDITION OF PRINTING ENVIRONMENT | ① RESTORE TO NORMAL PRINTING ENVIRONMENT |
| OBTAIN USER'S INTENTION | ELAPSE OF PREDETERMINED TIME | ① RE-PLANNING |

FIG. 39

| PROPERTY | ORIGINAL DOCUMENT | COLOR PRINTER | MONOCHROMATIC PRINTER |
|---|---|---|---|
| PRINTER TYPE | | BJ | LBP |
| COLOR OR MONOCHROMATIC | INCLUDING COLORED IMAGE | COLOR | MONOCHROMATIC |
| RUNNING COST | | 20 YEN/SHEET | 5 YEN/SHEET |
| PRINTING SPEED | | 5 SHEETS/MIN | 20 SHEETS/MIN |
| ORIGINAL DOCUMENT SIZE | A4 | A4 | A3 |
| OUTPUT DOCUMENT SIZE | | A4 | A3 |
| KINDS OF PAPER USABLE | | ORDINARY, BJ, OHP | ORDINARY, OHP |
| ABILITY OF ENLARGEMENT/REDUCTION | | UNABLE | 50%~200% |
| ABILITY OF LAYOUT | | UNABLE | VERTICAL · HORIZONTAL · DIVISION INTO 4 PARTS |
| PRINTING ORIENTATION | | CHANGEABLE | CHANGEABLE |
| PAPER FEED MODE | | MANUAL FEED, CARTRIDGE | MANUAL FEED, A3 CARTRIDGE, A4 CARTRIDGE |
| ABILITY OF BOTH-SIDE PRINTING | | UNABLE | ENABLE |
| DESIGNATION OF BINDING DIRECTION | | ENABLE | ENABLE |
| DESIGNATION OF BINDING MARGIN | | ENABLE | ENABLE |
| DESIGNATION OF FONT | | ENABLE | ENABLE |

FIG. 40

| STATUS | COLOR PRINTER | MONOCHROMATIC PRINTER |
|---|---|---|
| OPERATING CONDITION | NORMAL | NORMAL |
| RESIDUAL SHEETS | 80% OR MORE | 80% OR MORE |
| RESIDUAL TONER | 80% OR MORE | 80% OR MORE |
| PRINTED DOCUMENT | NONE | DOCUMENT OF USER A DOCUMENT OF USER B |

APPARATUS AND METHOD FOR PROCESSING INFORMATION WITH RECOGNIZING A SITUATION AND MEDIUM STORING PROGRAM THEREFOR

BACKGROUND THE INVENTION

Field of the Invention

The present invention relates to information processing for use in a system in which one apparatus is connected to other apparatus.

Description of the Related Art

When various processes are executed in an environment where a plurality of apparatus are available, it has hitherto been conventional that the user selects the apparatus suitable for each of various processes to be executed, and instructs the selected apparatus to execute the corresponding process.

In the case of printing information created by a computer, for example, if the computer is connected to a plurality of printers through a network or the like, the user can operate the computer to instruct or designate the printer from which data is to be output, so that the data is printed by the specified printer.

The above related art has however had a problem that if the specified apparatus cannot execute the instructed process at all, or completely, because of some failure or deficiency of any function, the process instructed cannot be achieved as intended by the user.

For solving such problem, it has been required for the user to confirm the result of the process and to instruct the same process or an additional process again to another apparatus if the original result is unsatisfactory.

Further, even when there is another apparatus which is more suitable for achieving the intended process than the apparatus instructed by the user, the process can be executed only by the apparatus instructed by the user.

SUMMARY OF THE INVENTION

An objective of the present invention is therefore to provide an information processing system and method which can relieve the burden of operation required of the user for achieving the purpose of a process.

Another objective of the present invention is to provide an information processing system and method which can relieve the burden of operation required of the user for achieving the purpose of a process, and can utilize the optimum one of available apparatus resources.

According to one aspect, the present invention which achieves these objectives relates to an information processing system made up of a plurality of apparatus, at least one of the apparatus comprising receiving means for receiving information, analyzing means for analyzing the received information, and deciding means for deciding, based on a result from the analyzing means, a process instructed by the user and an apparatus instructed to execute the process. An instructing means is for instructing another apparatus to execute the process, a recognizing means recognizes a situation, and a determining means for determines, based on the analysis result and the situation, whether the instructed process is to be executed by the instructed apparatus. An inquiring means issues an inquiry to the user when the determining means determines the instructed process is not to be executed by the instructed apparatus.

According to another aspect, the present invention which achieves these objectives relates to an information processing method in which information is received and analyzed, and based on result of the analyzing step, a process instructed by the user and an apparatus instructed to execute the process, a decision is made; and if so decided, another apparatus is instructed to execute the process. The situation is recognized, and based on the analyzed result and the situation, a determination is made as to whether the instructed process is to be executed by the instructed apparatus, and if not an inquiry is issued to the user According to still another aspect, the present invention which achieves these objectives relates to a computer-readable storage medium storing an information processing program for controlling a computer to perform the above-mentioned steps.

Other objectives and advantages besides those discussed above will be apparent to those skilled in the art from the description of preferred embodiments of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 13 is a table showing whether an advance notice is to be informed or not depending on the JOB type and conditions.

FIG. 15 is a flowchart showing a process sequence executed in Embodiment 9.

FIG. 17 is a representation showing an example of window indication for proposing an optimum way to the user.

FIG. 24 is a representation showing an example of Question Window.

FIG. 25 is a representation showing still another example of JOB tables.

FIG. 26 is a table showing an example of schedule data.

FIG. 27 is an illustration showing an example of inquiries made to the user.

FIG. 28 is a representation showing still another example of JOB tables.

FIG. 29 is a representation showing still another example of JOB tables.

FIG. 30 is an illustration showing an example of change in the printer status.

FIG. 31 is a printer status table.

FIG. 32 is a representation showing still another example of JOB tables.

FIG. 33 is a representation showing an example of Notice Window.

FIG. 34 is a representation showing still another example of JOB tables.

FIG. 35 is an illustration showing an example of change in the printer status.

FIG. 36 is a table showing rules for plans and actions.

FIG. 37 is a table showing rules for plans and actions.

FIG. 39 is a table showing an example of properties of each device.

FIG. 40 is a table showing an example of status of each device.

DESCRIPTION OF THE PREFERRED EMBODIMENTS

Preferred embodiments of the present invention will be described hereunder in detail with reference to the accompanying drawings.

[Embodiment 1]

Figure 1:
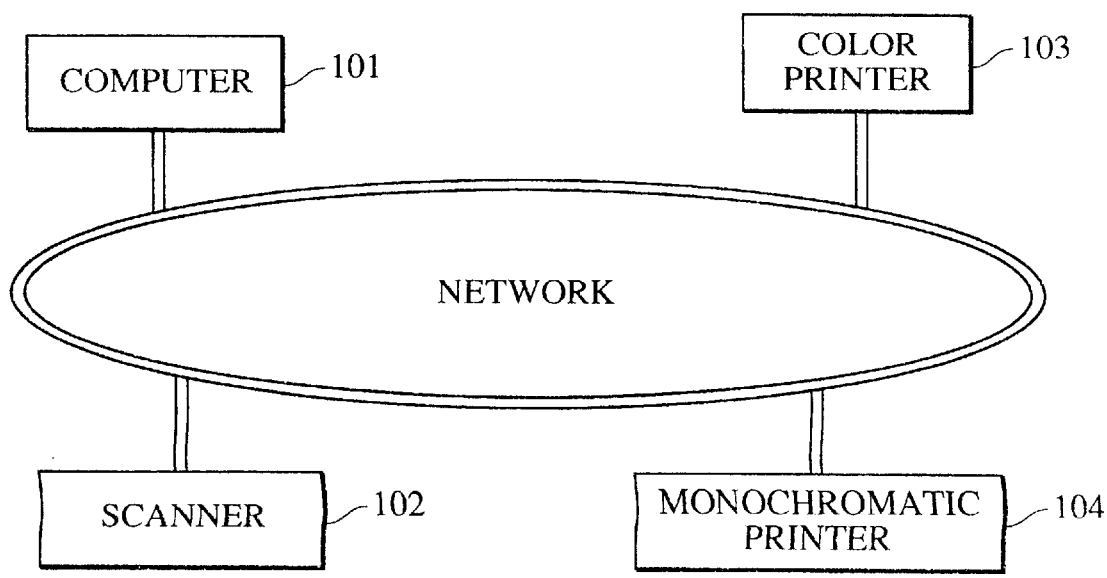
FIG. 1 is a block diagram showing the configuration of an information processing system according to one embodiment.

FIG. 1 shows the configuration of an information processing system according to one embodiment. In the system, a PC (personal computer) 101, a scanner 102, a color printer 103, and a monochromatic printer 104 are connected to a network.

According to this embodiment, in a system comprising a plurality of apparatus (equipment or devices) connected through a network, when execution of JOB is instructed to some apparatus, the instructed apparatus analyzes the JOB object from the JOB contents and grasps what is the JOB, to be executed by the apparatus itself. Based on the grasped result, the instructed apparatus acquires information necessary for the JOB to be executed and then execute the JOB.

When executing the JOB, if there is a more effective another other method or apparatus than that instructed, the instructed apparatus instructs the more effective apparatus to execute the process, or issues information to propose the more effective method to the user. Depending on the JOB contents, the instructed apparatus may also reject the instruction itself.

The types of JOBs include input operation by the user, an execution instruction from another equipment, a result obtained by analyzing the JOB, and a new JOB generated by itself during the idling state. In the case of reading a document with a scanner and printing the document using another printer, for example, there occur the JOBs below:

(1) process of analyzing the contents of an instruction given to the scanner from the user for the document set on the scanner, (2) process of reading and analyzing the document produced based on the analysis of the instruction received by the scanner from the user (or an event of the document being set on the scanner), and process of instructing a printer to print the read document, (3) process of transferring printing instructions to the printer, which are produced by the scanner in accordance with the instructed process, and (4) printing process produced in the printer by analyzing the printing instructions received from the scanner.

Details of a method for producing and managing such JOBs will be described below.

Procedures for executing those processes by a plurality of apparatus will be explained below in more detail with reference to the drawings.

Figure 2:
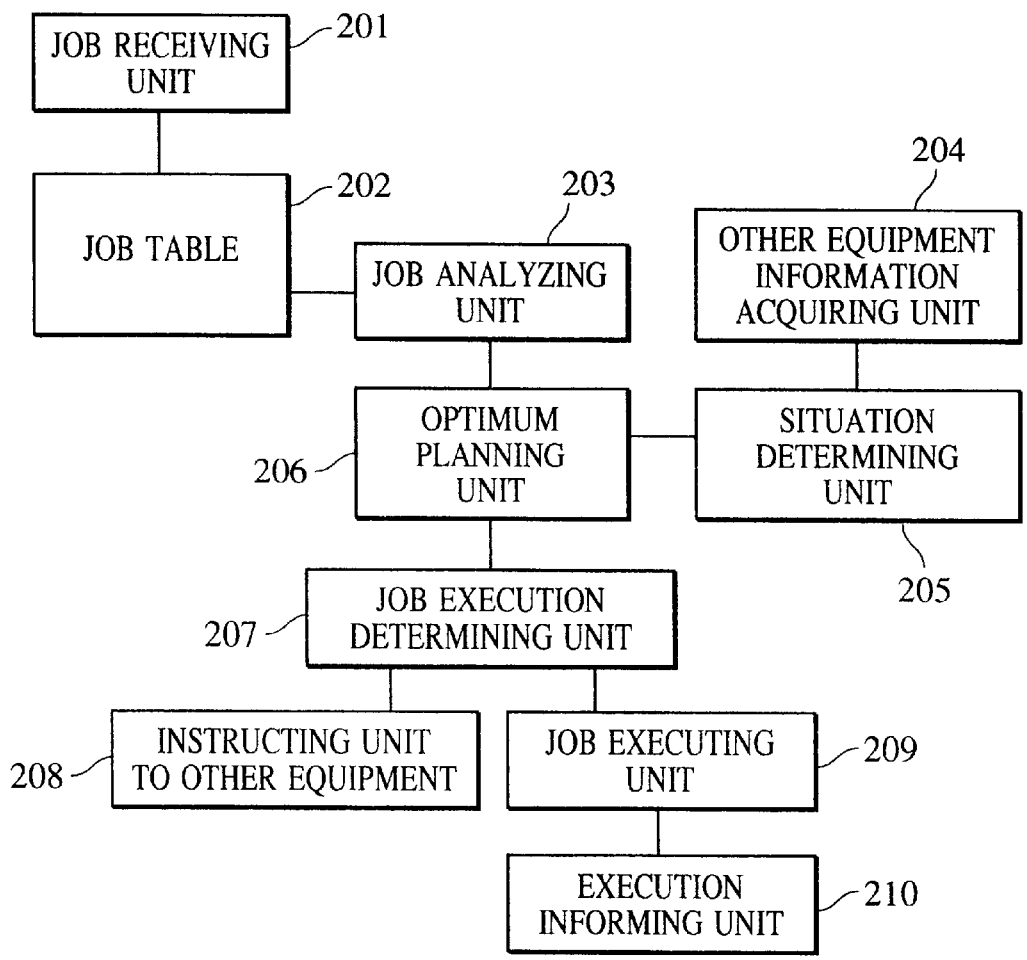
FIG. 2 is a block diagram showing the functional configuration of the system of that embodiment.

FIG. 2 shows the functional configuration of each apparatus for executing the processes in this embodiment. A job receiving portion 201 receives the JOB from the user or another apparatus. The received JOB is registered in a JOB table 202. A JOB analyzing portion 203 takes out and analyzes the JOB registered in the JOB table 202. An other-equipment information acquiring portion 204 acquires properties, current states, etc., of other equipment connected to the network. A situation determining portion 207 determines a situation from the current states of the other equipment, etc.

An optimum planning portion 206 makes an optimum plan in relation to the JOB. A JOB execution determining portion 206 determines whether the JOB is to be executed or not, and if executed, whether the JOB is to be executed by itself or by other equipment. When the JOB is to be executed by other equipment, execution of the JOB is instructed to that equipment from an instructing portion 205 to the other equipment. When the JOB is executed by itself, a JOB executing portion 209 executes the JOB. A JOB informing portion 210 informs the user that e.g., the execution is instructed or assigned to other equipment.

Figure 3:
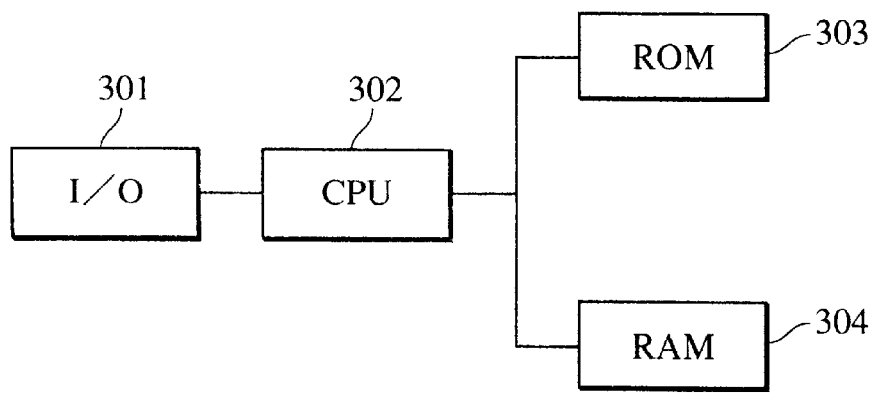
FIG. 3 is a block diagram showing the hardware configuration of each apparatus in the system of that embodiment.

FIG. 3 shows the hardware configuration of each apparatus for executing the processes in the embodiment.

A I/O 301 performs input/output operation with respect to the exterior of the apparatus itself. An CPU 302 executes programs and controls the various portions of the apparatus. A ROM 303 stores therein programs executed by the CPU 302 in accordance with flowcharts explained later, as well as fixed data. A RAM 304 temporarily stores therein various variables and intermediate data generated during the process, such as the properties, current states, etc., of the other equipment acquired from the other-equipment information acquiring portion 204. Further, programs may be loaded and stored in the RAM 304 from, e.g., the exterior of the apparatus.

Figure 4:
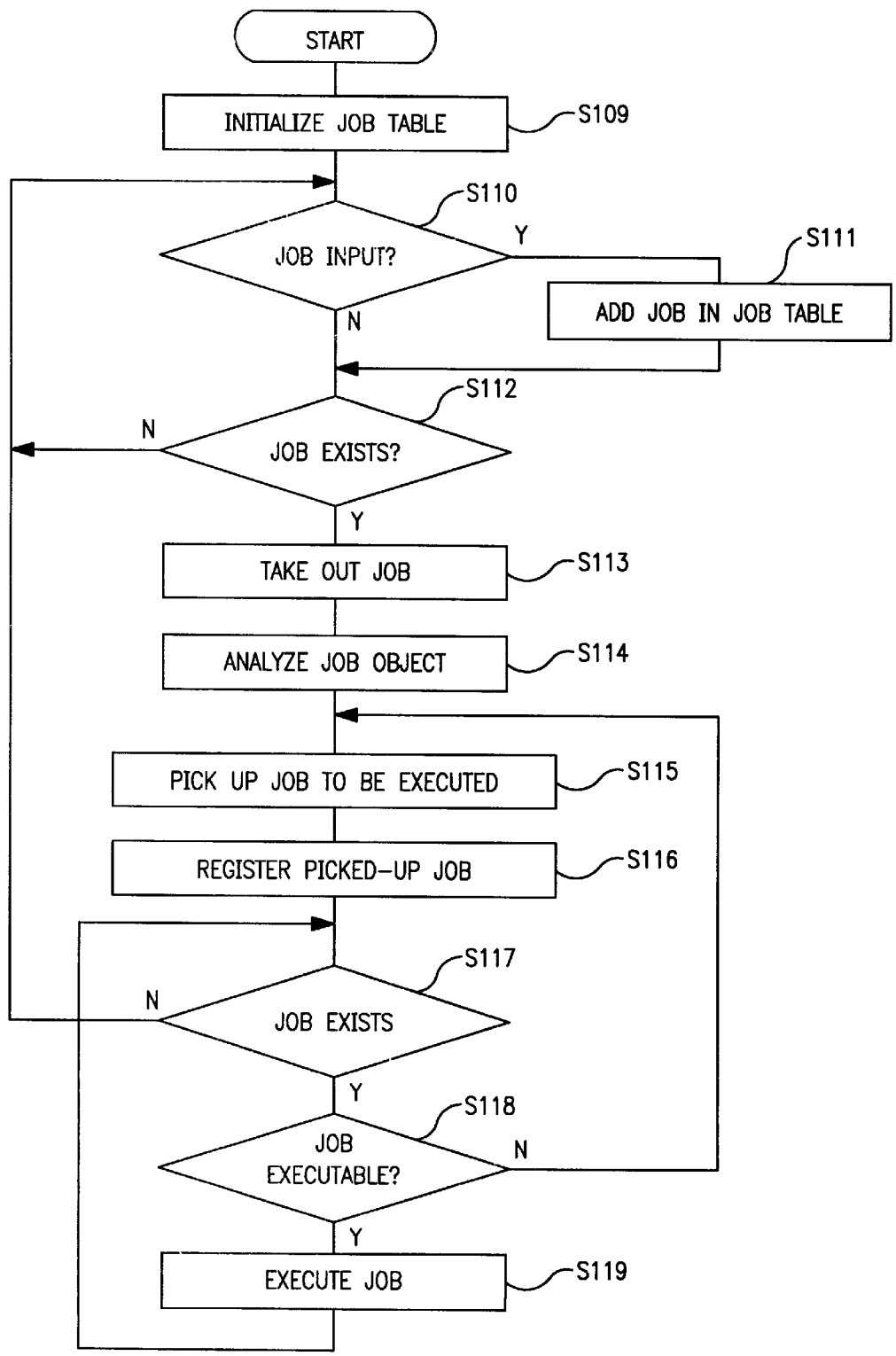
FIG. 4 is a flowchart showing a process flow executed in that embodiment.

FIG. 4 is a flowchart showing a process flow executed in this the embodiment.

First, in step S109, the contents of the JOB table are initialized. In step S110, it is determined whether a JOB is input or not by checking if there is a JOB input from the user, a JOB input from a device, etc., detectable by the system, a result obtained by analyzing any of these JOBs, or a new JOB generated by itself during the idling state. If a JOB is input, then the input JOB is added to the JOB table in step S111. Step S112 checks whether a JOB exists in the JOB table or not. If yes, then the JOB is taken out in step S113. In step S114, the apparatus analyzes an instruction given to it and derives the object of the JOB from the analyzed instruction. In step S115, one or more other JOBs to be executed additionally are picked up based on the analyzed instruction. In step S116, the JOBs picked up in step S115 are registered in the JOB table.

Step S117 checks whether there remains a JOB not yet executed. If yes, then the process flow goes to step S118. In step S118, it is determined whether the JOB is executable or not. If the JOB is determined to be not executable, then the process flow returns to step S115 for picking up the JOB to be executed next. The apparatus executes the JOB in step S119, followed by returning to step S117.

For example, when the user in puts an instruction for reading a document from a scanner and printing the document by another printer, the user's object (intention) is analyzed as being to obtain a printed document. In this case, a process of reading and analyzing the document produced based on the analysis of the instruction received by the scanner from the user, and a process of instructing a printer to print the read document, are also picked as JOBs. Details of the preferred flow of these processes will be described hereinbelow in connection with practical examples.

Figure 5:
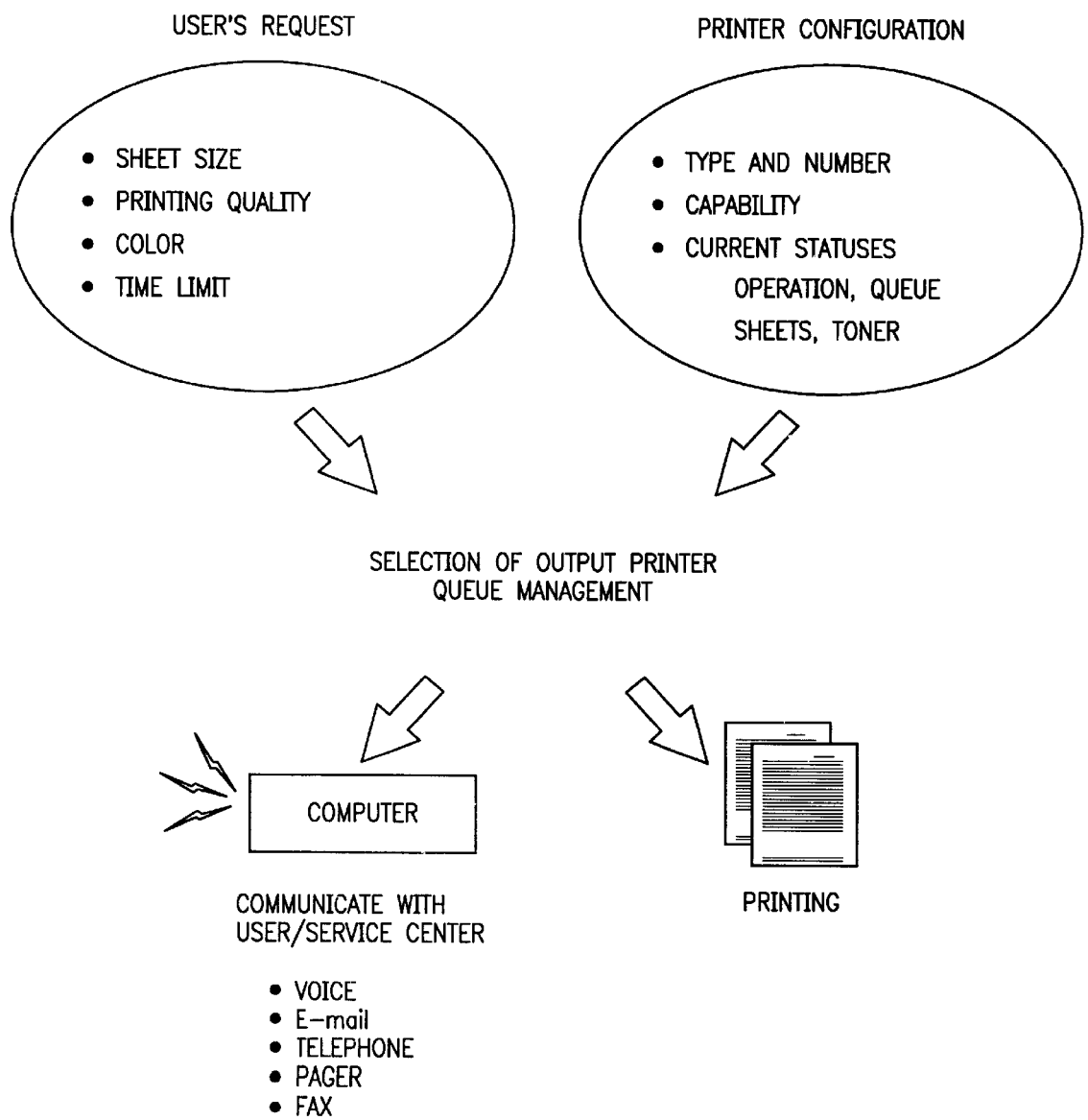
FIG. 5 is an illustration showing a process flow for selecting optimum one of a plurality of printers and executing printing by the selected printer.

FIG. 5 shows a process flow for selecting the optimum one of a plurality of printers and executing printing by the selected printer.

In FIG. 5, JOB information is input/transmitted in the form of a command from a host computer, an instruction from a remote controller, a command in natural language issued as voice by the user, or a bar code or a sentence read from a cover page and analyzed.

A device having received the JOB information analyzes the JOB, and selects and outputs a printer capable of executing the processes in conformity with the JOB. If there is a notice instruction, then the device selects an optimum medium for sending a notice to the destination device and conveys the notice to it.

To that end, in response to a user's request, the device refers to the configuration of printers and selects suitable one of the printers, causing the selected printer to execute printing. At this time, depending on the situation, the device may also allocate the process to a plurality of printers. Further, if there is a notice instruction, then the device selects an optimum medium for sending a notice to the destination device and informs it of the printer name selected to execute printing, the end of printing, etc.

The user's request includes the sheet size, printing quality, color, time limit (e.g., a request for finishing printing by 5 o'clock), etc. The printer configuration includes the types and number of printers, capability, current state (whether each of the printers is operating normally, whether there is a queue waiting for printing, whether sheets and toner are not insufficient, etc.). A medium or method for sending the notice can be any of outputting the notice by voice at the user's terminal, giving the notice over a telephone, sending a message to a pager, and transmitting the notice in the form of a document via E-mail or fax (facsimile).

A description will be made of the situation where the process showing in FIG. 5 is carried out by a plurality of apparatus in accordance with the flowchart of FIG. 4.

When an instruction of requesting some document to be output urgently by 5 o'clock, for example, is given to a host computer in step S110, the JOB is added in the JOB table in step S111. The JOB is taken out in step S113, and the given instruction is analyzed in step S114. The JOB object is derived from the analyzed information.

In step S115, the following JOBs are picked up from the analyzed information:

(1) a JOB to acquire, from the document to be output, information (sheet size, printing quality, colored or monochromatic document, etc.) for selecting a printer suitable for outputting the document, limit time, etc.

(2) a JOB to select one of the connected printers which is fit for the information acquired in (1).

(3) a JOB to check whether the selected printer has any trouble in outputting the document.

(4) a JOB to output the document to the selected printer.

(5) a JOB to inform the selected printer and the execution of output of the document.

In step S116, the JOBs picked up in step S115 are registered in the JOB table. The above steps are repeated until it is determined in step S117 that the picked-up JOBs have all been processed, i.e., that there remains no JOB. Step S118 determines whether the JOB is executable or not. If the JOB is determined to be not executable, then the JOB to be executed next is picked up. In step S119, the picked-up JOBs are executed sequentially.

[Embodiment 2]

Figure 6:
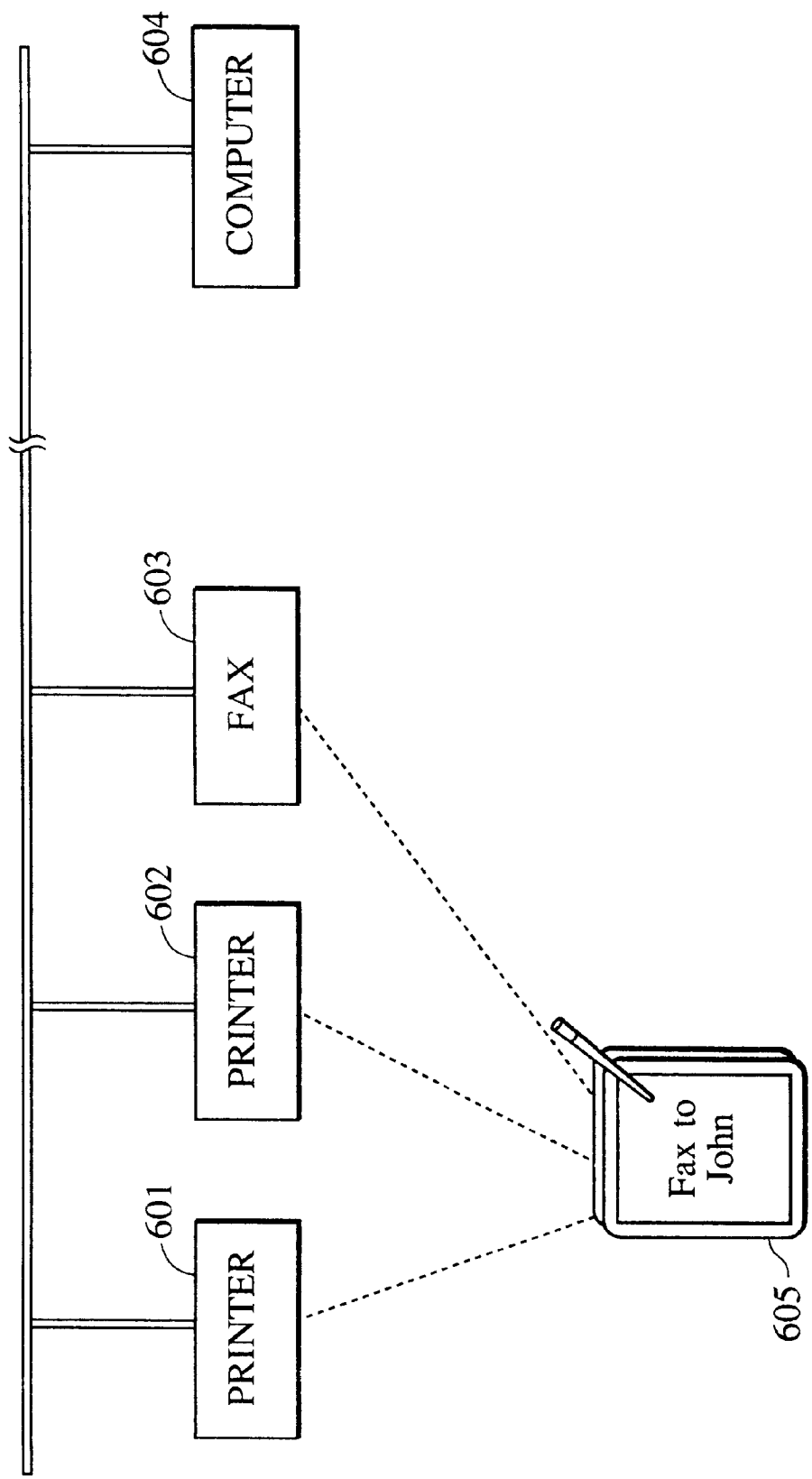
FIG. 6 is a block diagram for explaining the case where a controller is used.

FIG. 6 is a block diagram for explaining the case where a remote controller (hereinafter referred to simply as a controller) is used as means for giving instructions to the various devices.

A controller 605 has a display for indicating a control panel or information corresponding to each of various devices, such as printers 601, 602, a fax 603 and a PC 604, just when it comes close to the device, and can control the device by giving an instruction to it. In addition, the controller 605 can control, from one of the devices near it, another far away from it via a network.

Also, the controller 605 can monitor and display the status of each of the devices, and can acquire the status of the device located far away from it on the network.

[Embodiment 3]

Figure 7:
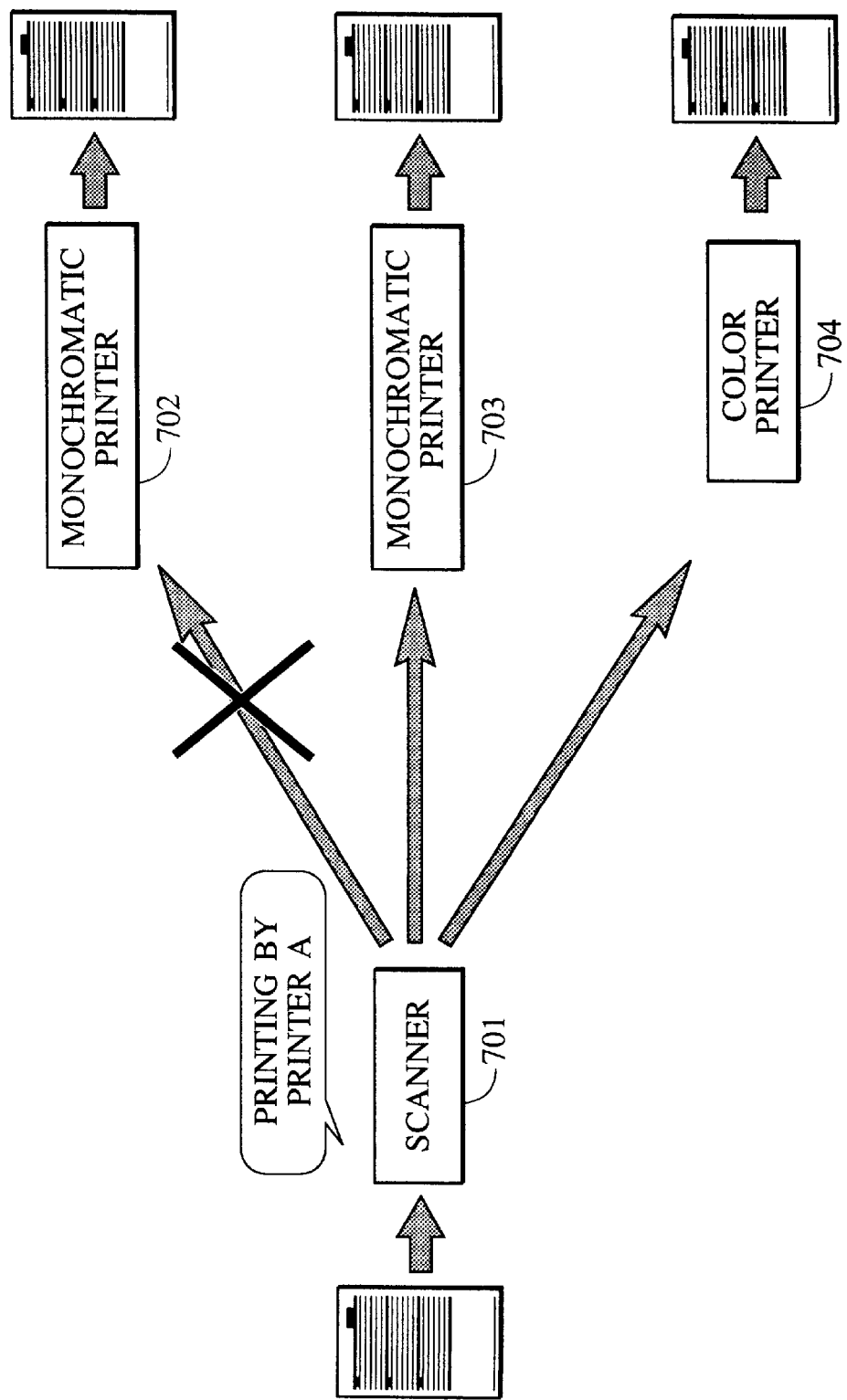
FIG. 7 is an illustration showing an example of the case where a document is read from a scanner and then transmitted to a particular printer.

FIG. 7 shows an example of the case where a document is read from a scanner and then transmitted to a particular printer.

After a document has been read by a scanner 701, the user specifies the destination device (by utilizing voice, etc.). Alternatively, if the destination device is specified on a cover page, the destination device is automatically determined. After a monochromatic printer 702 has been thus determined as the destination device, any of the following processes is executed depending on the acquired status of the destination device:

(1) when the destination device is unable to perform printing, the document is sent to an alternative printer (e.g., a monochromatic printer 703) for printing, (2) when the printer specified as the destination device is unable to perform printing (due to conditions such as including a colored page or being different in sheet size), only the relevant page is transmitted to another printer (e.g., a color printer 704 if that page includes a color image), (3) when the document has a large number of pages, printing is made in parallel by using several printers, and (4) when a forwarding device is specified in the destination device, the document is transmitted to the forwarding device.

[Embodiment 4]

Figure 8:
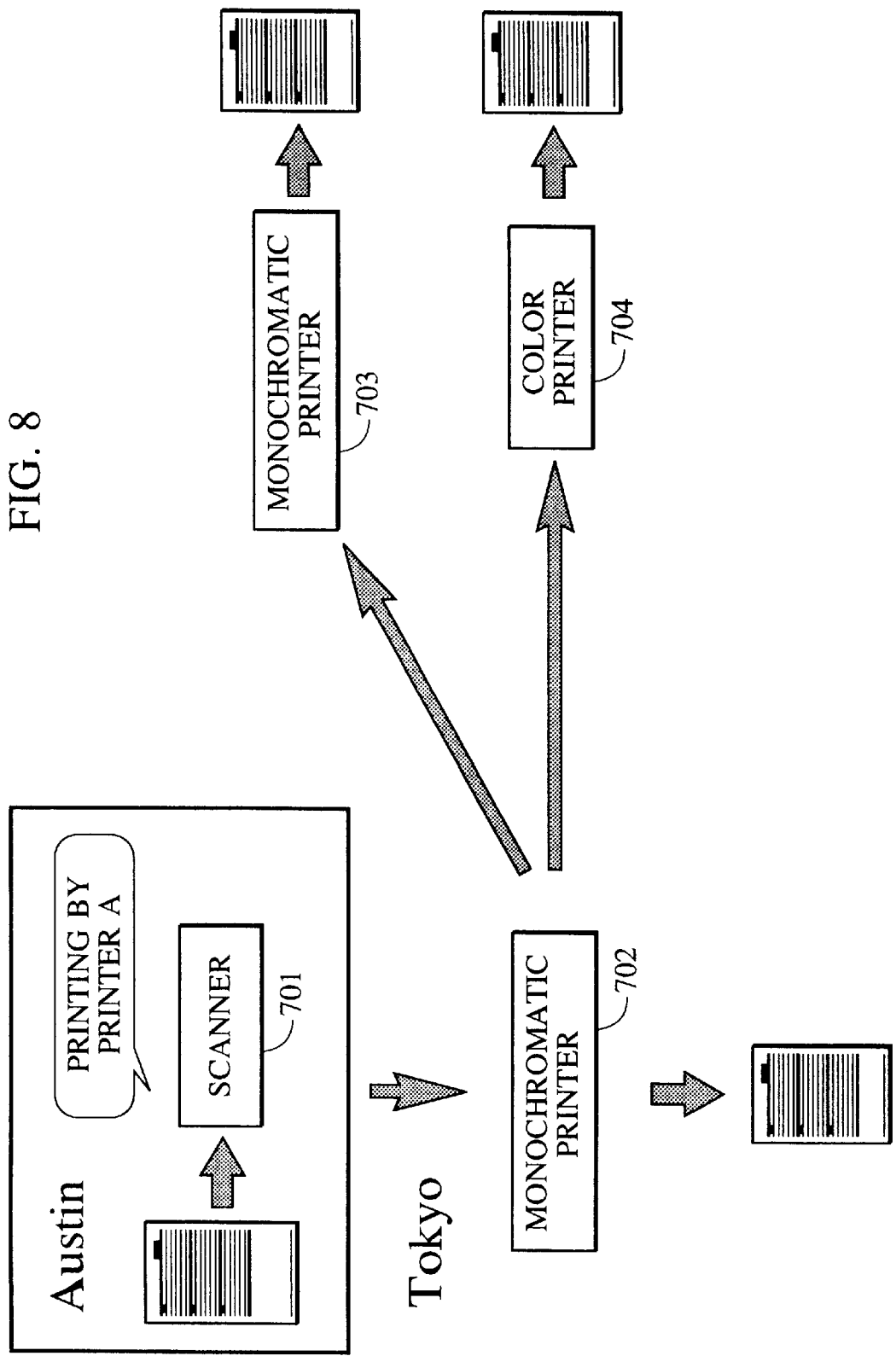
FIGS. 8–10 are illustrations showing examples of the case where a document is read from a scanner and then transmitted to a particular printer which cannot be managed by the scanner.

FIG. 8 shows an example of the case where a document is read from a scanner and then transmitted to a particular printer which cannot be managed by the scanner (for the reason that network domains are different from each other).

After a document has been read by a scanner 701 located in Austin, the user specifies the destination device (by utilizing voice, etc.). Alternatively, if the destination device is specified on a cover page in the form of a character string or bar code, the destination device is determined by reading, recognizing and interpreting it. After a monochromatic printer 702 located in Tokyo has been thus determined as the destination device and the document has been actually sent to the monochromatic printer 702, any of the following processes is executed depending on the acquired status of the destination device:

(1) when the monochromatic printer 702 is unable to perform printing by itself, the printer 702 sends the document to an alternative printer (e.g., a monochromatic printer 703) for printing, (2) when the monochromatic printer 702 is unable to print the received document (in point of conditions such as including a colored page and sheet size), the printer 702 transmits the whole of the received document or only the relevant page to another printer (e.g., a color printer 704 if that page includes a color image), (3) when the document has a large number of pages, the monochromatic printer 702 performs printing by itself and simultaneously allocates respective lots to other several printers as well for parallel printing.

(4) when a forwarding device is specified in the monochromatic printer 702, the printer 702 automatically transmits the document to the forwarding device.

Embodiment 3 differs from Embodiment 4 in that the scanner 701 determines the destination device in Embodiment 3, whereas the printer 702 having received the document from the scanner 701 determines the destination device in Embodiment 4.

[Embodiment 5]

Figure 9:
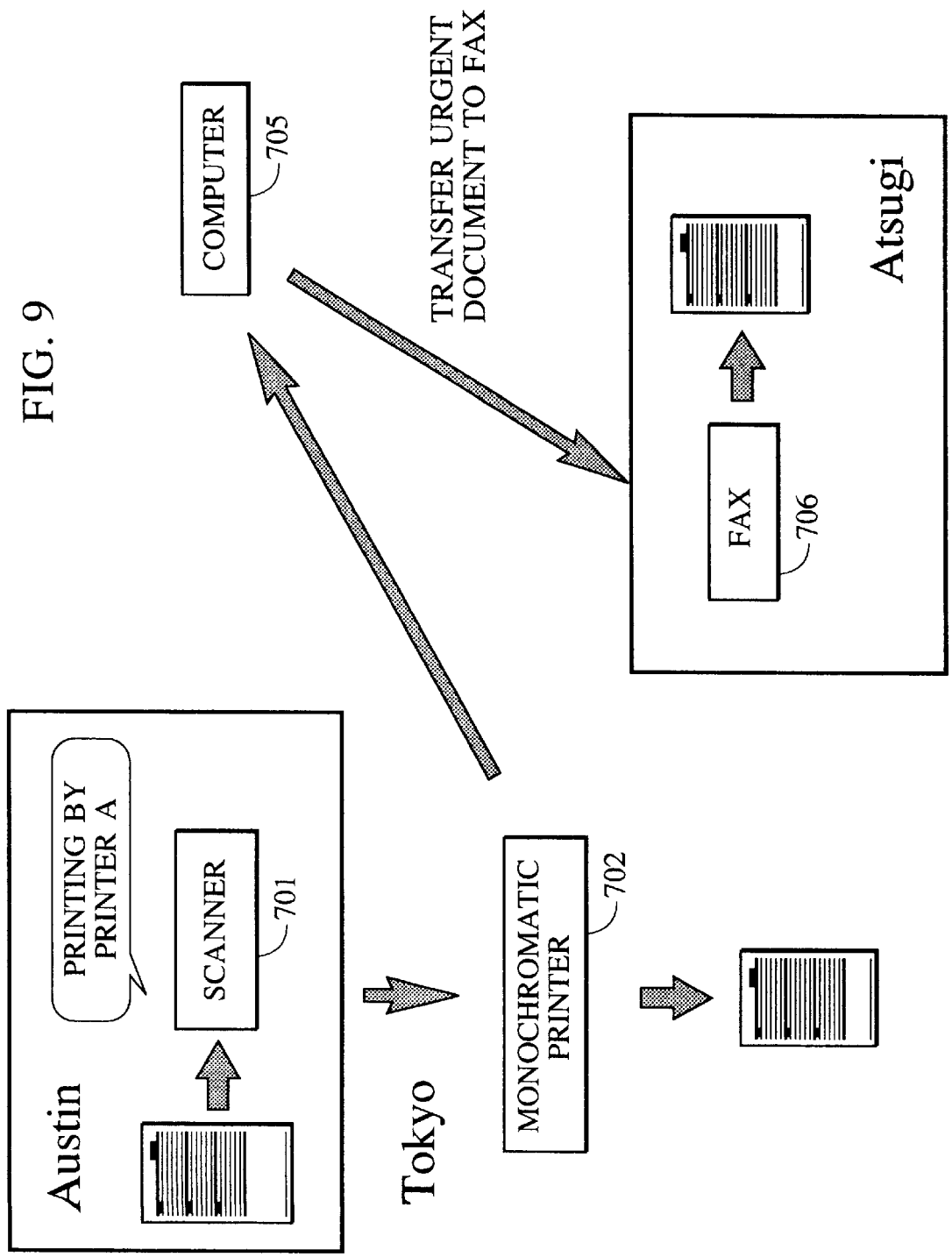

FIG. 9 shows an example of the case where a document is read from a scanner and then transmitted to a particular printer which cannot be managed by the scanner (for the reason that network domains are different from each other).

After a document has been read by a scanner 701 locating in Austin, the user specifies the destination device (by utilizing voice, a keyboard, etc.). As an alternative, if the destination device is specified on a cover page in the form of a character string or bar code, the destination device is determined by reading, recognizing and interpreting it. After a monochromatic printer 702 locating in Tokyo has been thus determined as the destination device and the document has been actually sent to the monochromatic printer 702, the document is transferred to a PC 705 capable of executing a more sophisticated process.

As a result, the PC 705 determines (from the word "urgent" on the cover letter, for example) that the document is urgent one, and if it is known from the schedule data where the receiver of the document is now, the PC 705 transfers the document to that place (e.g., Atsugi, JAPAN). At this time, if the destination device is a different medium, e.g., a facsimile 706 instead of another printer, medium conversion is carried out before transmitting the document.

[Embodiment 6]

Figure 10:
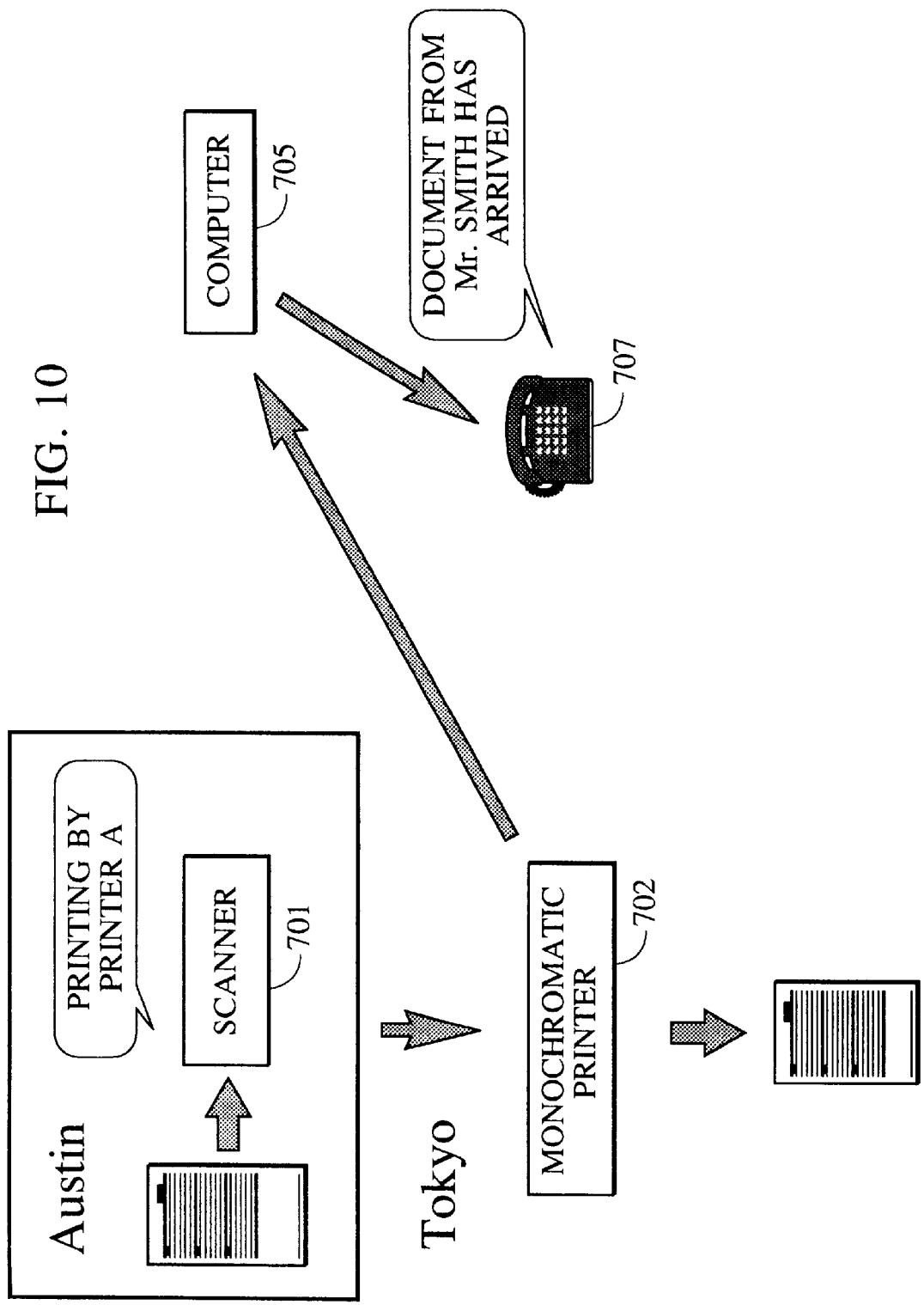

FIG. 10 shows an example of the case where a document is read from a scanner and then transmitted to a particular printer which cannot be managed by the scanner (for the reason that the network domains are different from each other).

After a document has been read by a scanner 701 located in Austin, the user specifies the destination device (by utilizing voice, etc.). As an alternative, if the destination device is specified on a cover page in the form of a character string or bar code, the destination device is determined automatically by reading, recognizing and interpreting it. After a monochromatic printer 702 located in Tokyo has been thus determined as the destination device and the document has been actually sent to the monochromatic printer 702, the document is transferred to a PC 705 capable of executing a more sophisticated process. As a result, the PC 705 can recognize the receiver of the document, prepare a notice sentence, and inform the document receiver of arrival of the document over a telephone 707.

[Embodiment 7]

Figure 11:
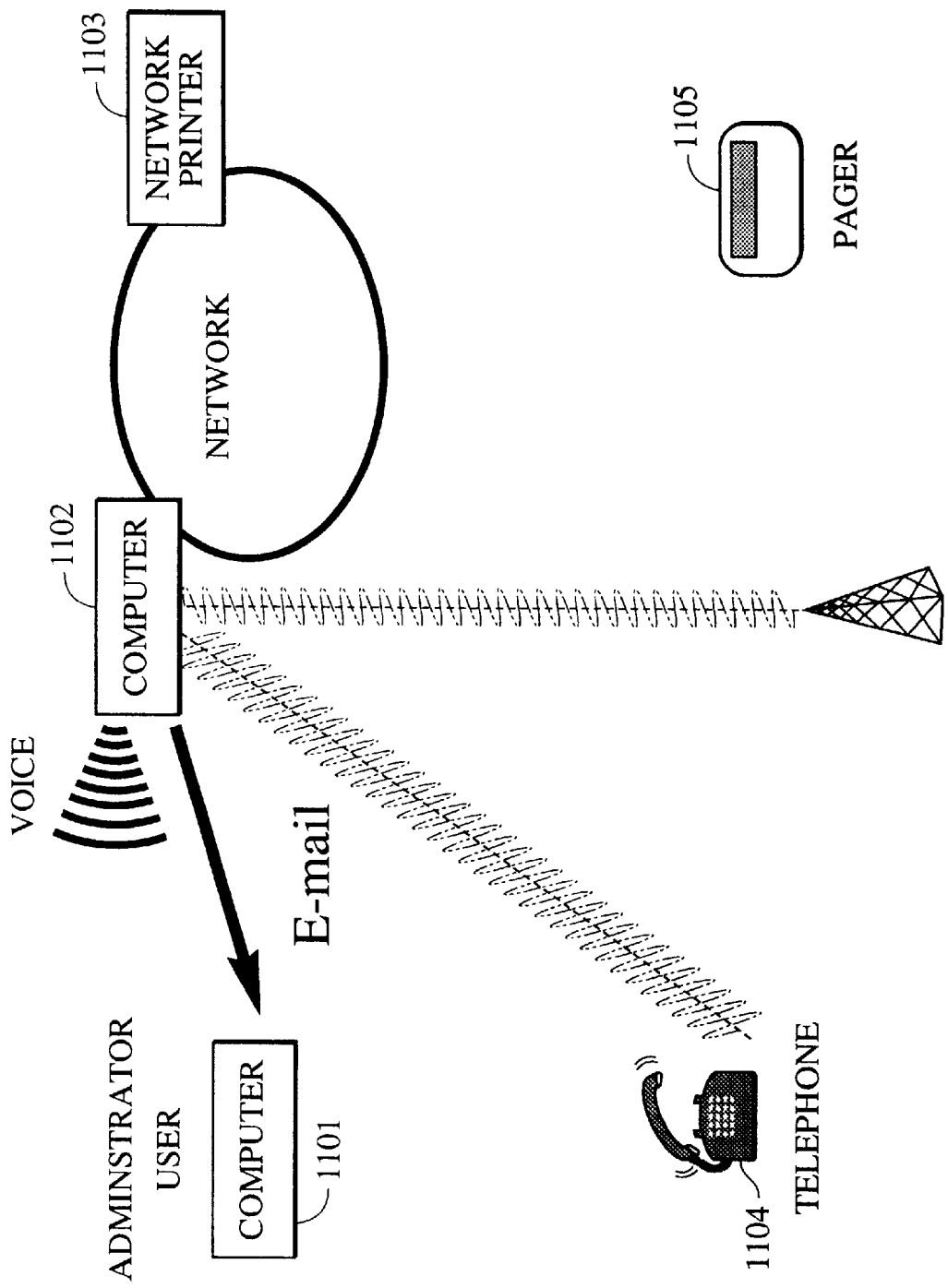
FIG. 11 is an illustration showing an example of informing a use of the printer status.

FIG. 11 shows an example of the case of informing the printer status.

A PC 1102 acquires the status of a printer 1103 via a network. Upon detecting a change in the printer status such as the occurrence of an error or event, the PC 1102 determines the destination to be informed, e.g., the user or management staff, depending on the nature of the detected change, and then issues a notice by the use of a medium corresponding to the determined destination. The notice may be informed to a terminal 1101 of the user or management staff by, for example, sending it through E-mail, placing a call to a telephone 1104, or transmitting a message to a pager 1105.

In this connection, in Embodiment 6 (FIG. 10), the reception of the document may be communicated by using E-mail or a pager, for example, instead of the telephone 707.

[Embodiment 8]

In this embodiment, when the apparatus instructed to execute JOB actually executes the JOB by itself, it informs or confirms the contents of the JOB prior to starting the execution depending on the JOB type and conditions, or cancel the JOB which is determined to be useless for the user, without executing the instructed JOB.

Figure 12:
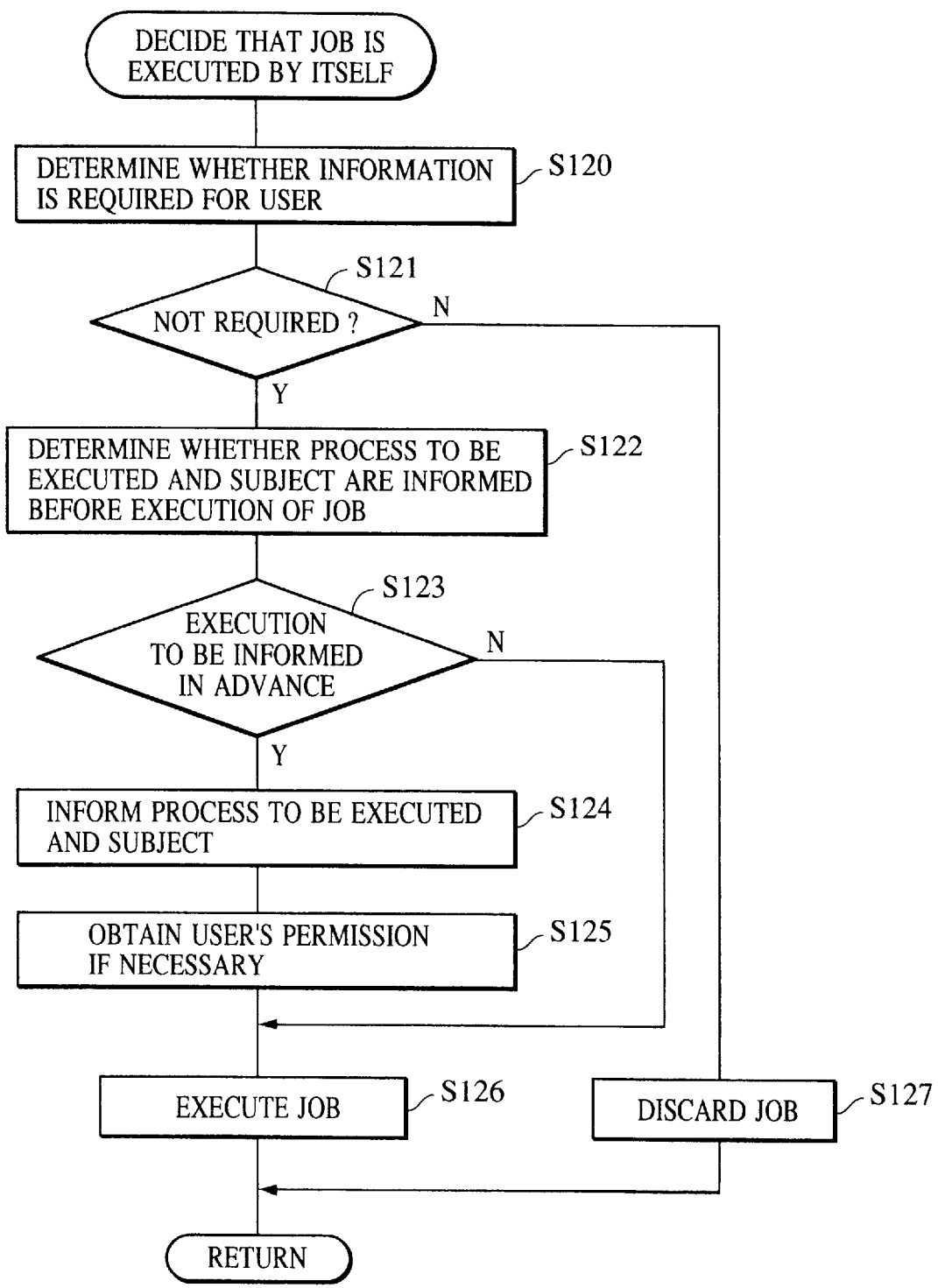
FIG. 12 is a flowchart showing a process sequence executed in Embodiment 8.

FIG. 12 is a flowchart showing a process sequence executed in this Embodiment 8. FIG. 13 is a table showing whether an advance notice is to be informed or not depending on the JOB type and conditions.

In FIG. 12, it is first determined in step S120 whether the JOB is necessary for the user or not. If necessary, then the process subsequent to step S122 is executed, but if not necessary, the JOB is discarded in step S127. Step S122 determines whether the process to be executed and the subject are to be informed to the user before executing the instructed JOB, by referring to information of the advance notice corresponding to the JOB type and conditions shown in FIG. 13, or by analyzing the contents written on the cover letter or the like. If the advance notice is determined to be not necessary, then the process flow goes to step S126. If the advance notice is determined to be necessary, then the process flow goes to step S124 for informing the process to be executed and the subject. Further, if necessary, a permission to execute the JOB is obtained from the user in step S125. Then, the JOB is executed in step S126.

A description will now be made of an example in which when the JOB object is to carry out filing of information, the system analyzes the contents of the information prior to staring to execute the filing and then informs the user of the analyzed contents (subject).

Figure 14A:
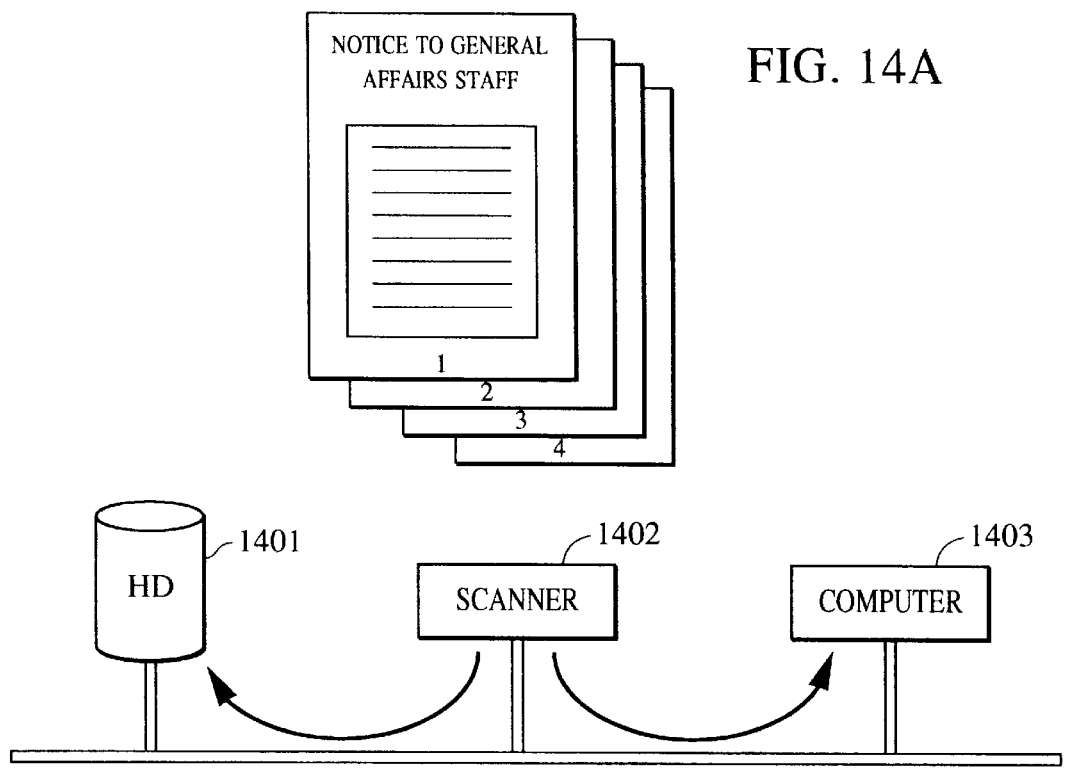
FIGS. 14A and 14B are illustrations showing the case of discarding useless information when information to be filed is transmitted to the user.

FIG. 14A shows the case of, in a filing process, informing the user beforehand of the information to be filed. Denoted by 1401 is a file storage, 1402 is a scanner, and 1403 is a user terminal (computer). The process executed by the scanner 1402 in FIG. 14A will be explained below in accordance with the flowchart of FIG. 12.

In step S120, the scanner 1402 determines that the instructed JOB is one important for the user because it is information filing JOB. In step S122, the scanner refers to the specified information as shown in FIG. 13 and determines that the information to be filed should be sent prior to starting the filing process, followed by scanning the information. For sending the information to be filed, the process flow goes to step S124. In step S124, the scanned information is sent to the user terminal 1403 via a network. Finally, the filing JOB is executed in step S126.

A description will next be made of an example in which, when information is received, but it is determined to be not at all concerned with the user as a result of analyzing the received first page, subsequent information is rejected (i.e., will not be received).

Figure 14B:
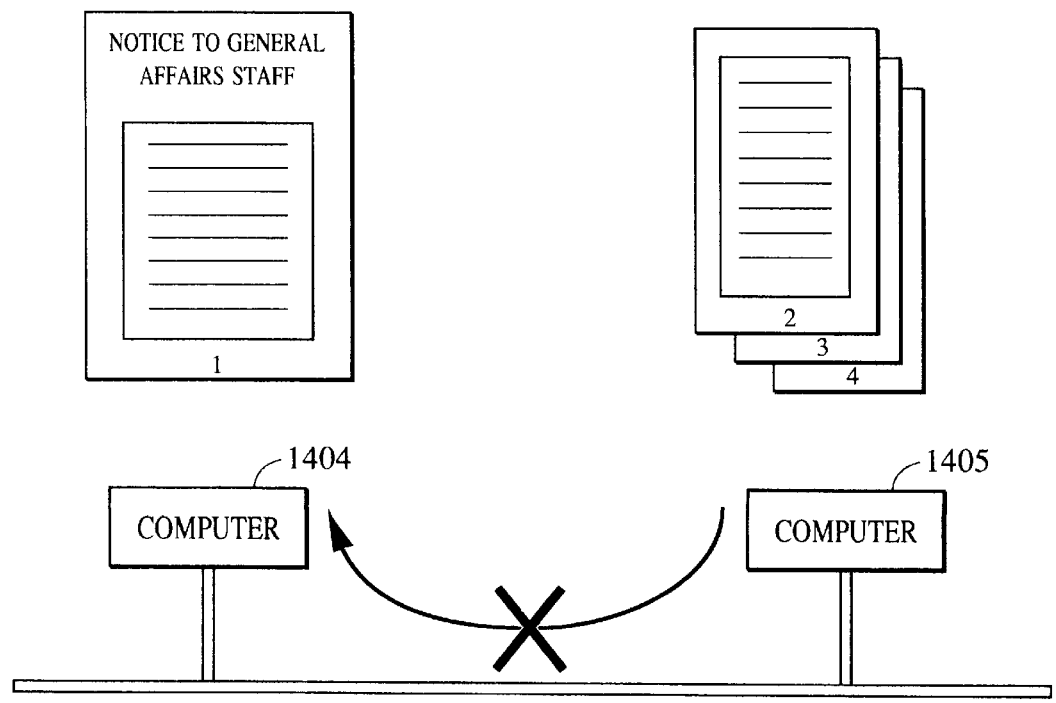

FIG. 14B shows the case of determining whether a large amount of received data is necessary or not based on the first page thereof, and discarding information of the subsequent pages. Denoted by 1404 is a PC on the receiving side and 1405 is a PC on the transmitting side.

The process executed by the PC 1404 in FIG. 14B will be explained below in accordance with the flowchart of FIG. 12.

In step S120, the PC 1404 analyzes the first page of the received information and determines that the received information is not concerned with users other than the general affairs staff and that it is not necessary to receive the information, judging from the title "Notice to General Affairs Staff". Accordingly, the process goes to step S127. The received first page is discarded in step S127, and the process is ended without receiving the information of the second and subsequent pages.

[Embodiment 9]

FIG. 15 is a flowchart showing a process sequence executed in this Embodiment 9. In this Embodiment 9, an apparatus instructed to execute a process determines whether the process is to be executed by itself or another apparatus. Depending on the determined result, the apparatus executes the process by itself or instructs another apparatus.

First, the apparatus determines in step S150 whether a JOB is input or not. If input, then the input JOB is added in the JOB table in step S151. It is checked in step S152 whether there is a JOB in the JOB table or not. If yes, then the JOB is taken out in step S153. In step S154, the apparatus analyzes an instruction given to it and grasps the object of the JOB based on the analyzed result. In step S155, the apparatus determines its own situation. In step S156, the apparatus determines situations of other apparatus corresponding to the JOB object.

If the apparatus determines based on the situations of itself and the other apparatus that it is optimum to execute the JOB by itself, then the process flow goes from step S157 to step S158, where it decides that the JOB is executed by itself. Thereafter, the apparatus executes the JOB by itself in step S159. On the other hand, if the apparatus determines that it is not optimum to execute the JOB by itself and there is another apparatus optimum for the JOB object, then the process flow goes from step S160 to step S161 where the apparatus decides that the JOB is to be executed by the other apparatus than itself. After that, in step S162, the apparatus instructs the other apparatus optimum for the JOB object to execute the JOB. In step S163, the apparatus informs the user that the JOB is executed by an other apparatus than itself.

If there is no other apparatus fit for the JOB object, then the process flow goes from step S160 to step S164 where the apparatus plans for an optimum method, not departing from the JOB object. In step S165, the plan is proposed to the user.

Figure 16A:
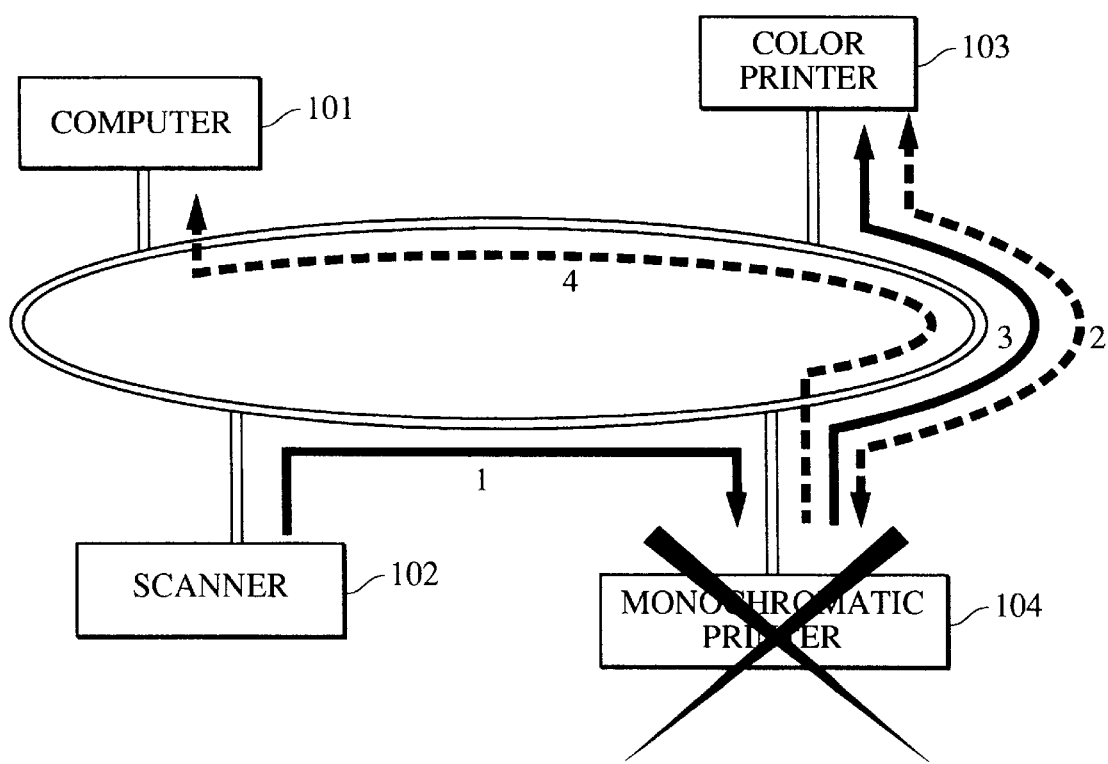
FIG. 16A is an illustration showing an information flow in Embodiment 9.

FIG. 16A shows an information flow in this Embodiment 9.

In the case where the user of a PC 101 gives the JOB of outputting information read by a scanner 102 to a printer 104, if the printer 104 is defective in printing operation, for example, then the printer 104 determines that it cannot execute the instructed JOB, and finds another printer 103 capable of executing the instructed JOB through communication with other apparatus. The printer 104 then determines that the JOB is to be executed not by itself, but by the printer 103, followed by instructing the printer 103 to execute the JOB. FIG. 16A represents the above process flow by solid and dashed arrows.

A process sequence followed by those associated apparatus to execute the process shown in FIG. 16A will be explained below in accordance with the flowchart of FIG. 15.

To explain first the process of the scanner 102, it receives in step S150 the JOB of scanning information and transmitting the information to the printer 104. The received JOB is added in the JOB table in step S151, and it is taken out in step S153. In step S154, the scanner 102 scans the data and grasps that the JOB is to transmit the information. The scanner 102 then determines in step S155 that it is operating normally and there is no problem in scanning and transmitting the instructed information.

In step S156, the scanner 102 understands that the JOB cannot be routed to any other apparatus. After determining in step S157 that it is optimum to execute the JOB by itself, the scanner 102 advances to step S158. The scanner 102 decides in step S158 that it will scan the information by itself, scans the information in step S159, and then transmits the information to the printer 104 via the network through a route 1.

On the other hand, the printer 104 receives, in step S150, the JOB of outputting the received information. The received JOB is added in the JOB table in step S151, and it is taken out in step S153. In step S154, the printer 104 grasps from the received information that the JOB is to output the information from the user of the PC 101 on sheets of paper. The printer 104 determines in step S155 that toner is used up in itself and that it therefore cannot output the information on sheets of paper. In step S156, the printer 104 communicates with other apparatus via the network to find another printer capable of outputting the received information, and determines that there is such a printer, i.e., the printer 103 can output the received information (route 2).

After determining in step S157 that the JOB cannot be executed by itself, the printer 104 advances to step S160. Since it is now determined in step S160 that the printer 103 can execute the JOB of outputting the information, the printer 104 decides in step S161 that it transmits the received information to the printer 103. In step S162, the printer 104 instructs the printer 103 to output the information transmitted to it from the printer 104 (route 3). In step S163, the printer 104 informs the user's PC 101 having instructed the JOB of that the instructed output of the information is executed in the printer 103 through E-mail (route 4).

Figure 16B:
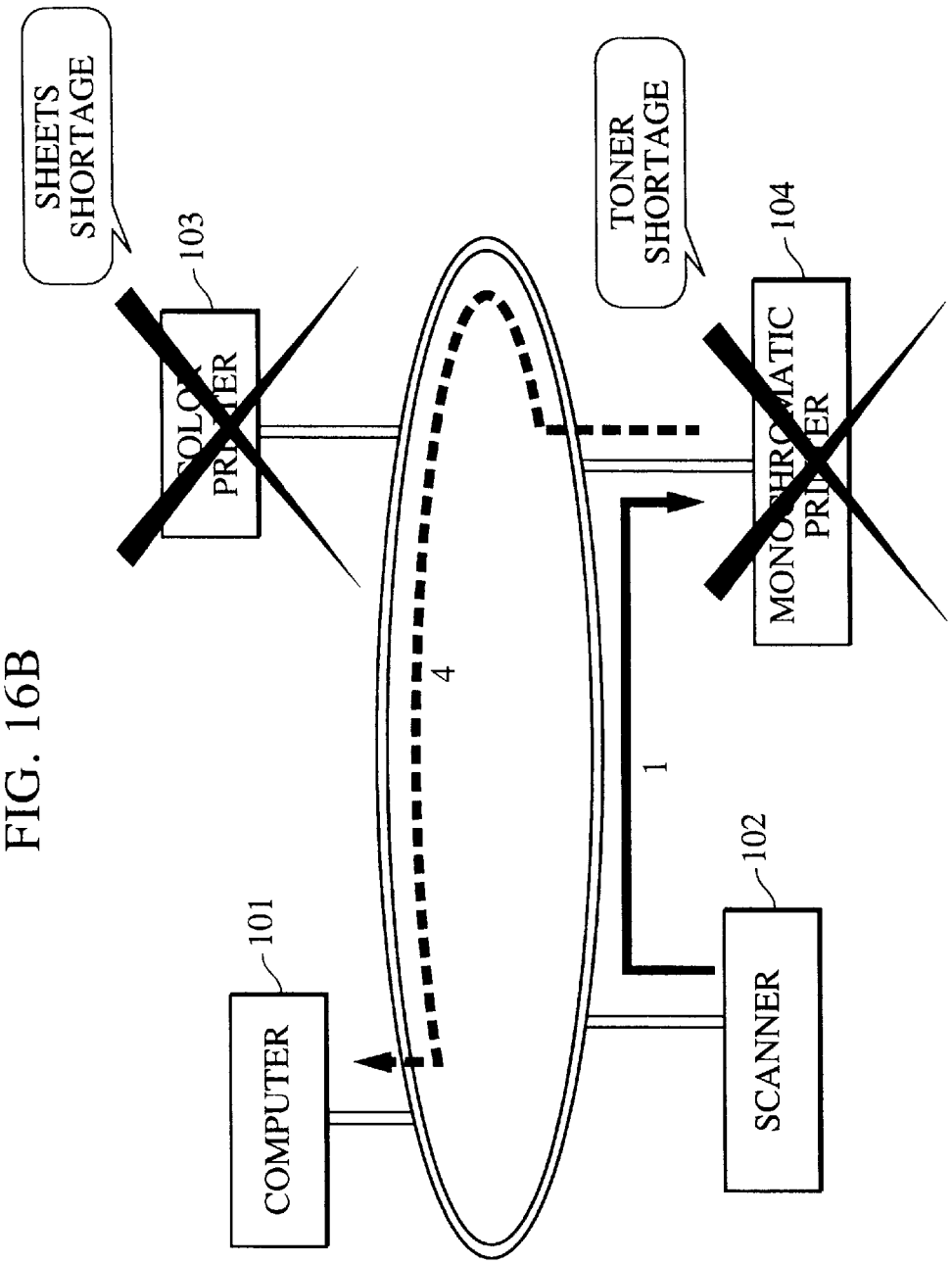
FIG. 16B is an illustration showing an information flow in the case where there is no apparatus fit for the JOB object.

FIG. 16B shows an information flow in the case where there is no apparatus fit for the JOB object.

In the case where the user of a PC 101 gives JOB of outputting information read by a scanner 102 to a printer 104, if the printer 104 is unable to execute printing because of toner shortage, the printer 104 communicates with other apparatus to find another printer 103 corresponding to the object of the given JOB, and determines the situation of the printer 103. Now, suppose the printer 103 is unable to execute printing because of sheets shortage, and there is no other printer capable of achieving the JOB object. Therefore, the printer 104 sends a notice to the PC 101 for offering to the user, as an optimum plan, a proposal of restoring the printer 104 or 103 to a printable state for carrying out the printing. FIG. 16B represents the above process flow by solid and dashed arrows.

A process sequence followed by those associated apparatus to execute the process shown in FIG. 16B will be explained below in accordance with the flowchart of FIG. 15.

The process from the step of reading a document by the scanner 102 to the step of transmitting the read document to the printer 104 is the same as in the above case.

The printer 104 receives, in step S150, the JOB of outputting the received information. The received JOB is added in the JOB table in step S151, and it is taken out in step S153. In step S154, the printer 104 grasps from the received information that the JOB is to output the information from the user of the PC 101 on sheets of paper. The printer 104 determines in step S155 that toner is used up in itself and it cannot output the information on sheets of paper. In step S156, the printer 104 communicates with other apparatus via the network to find out another printer capable of outputting the received information, but determines that there is no other suitable device because the printer 103 is also unable to execute the printing because of sheets shortage.

After determining in step S157 that the JOB cannot be executed by itself, the printer 104 advances to step S160. Since it is now determined in step S160 that there is no device capable of executing the JOB of outputting the information, the process flow goes to step S164. In step S164, the printer 104 plans for an optimum method to realize the JOB object of printing the information. The planning concludes that it is an optimum method to restore the status of a device, which has an ability of carrying out the printing, to the normal state. In accordance with the planning result, therefore, a proposal of restoring the printer 104 under toner shortage or the printer 103 under sheets shortage to a printable state is transmitted to the user in next step S165 with a window indication as shown in FIG. 17.

After that, a response from the user or a change in status of the printer itself is recognized as input of JOB, and the user's object can be achieved eventually through a similar process as explained above.

Details of the above planning will be described below in connection with Embodiments subsequent to Embodiment 11 on the basis of practical examples.

[Embodiment 10]

When deciding the JOB to be executed by itself in step S158 and executing the JOB in step S159 during the process of Embodiment 9, it is often preferable, prior to starting to execute the instructed JOB to, analyze the presence or absence of any problem in more detail as shown in a flowchart in FIG. 18, described later, and to inform the user of the problem or reject the JOB when execution of the JOB is not appropriate depending on the environment or situation for executing the JOB.

When an instruction of, for example, printing a confidential document is given, the instruction is rejected unless the user is confirmed as being allowed to receive the document.

Figure 18:
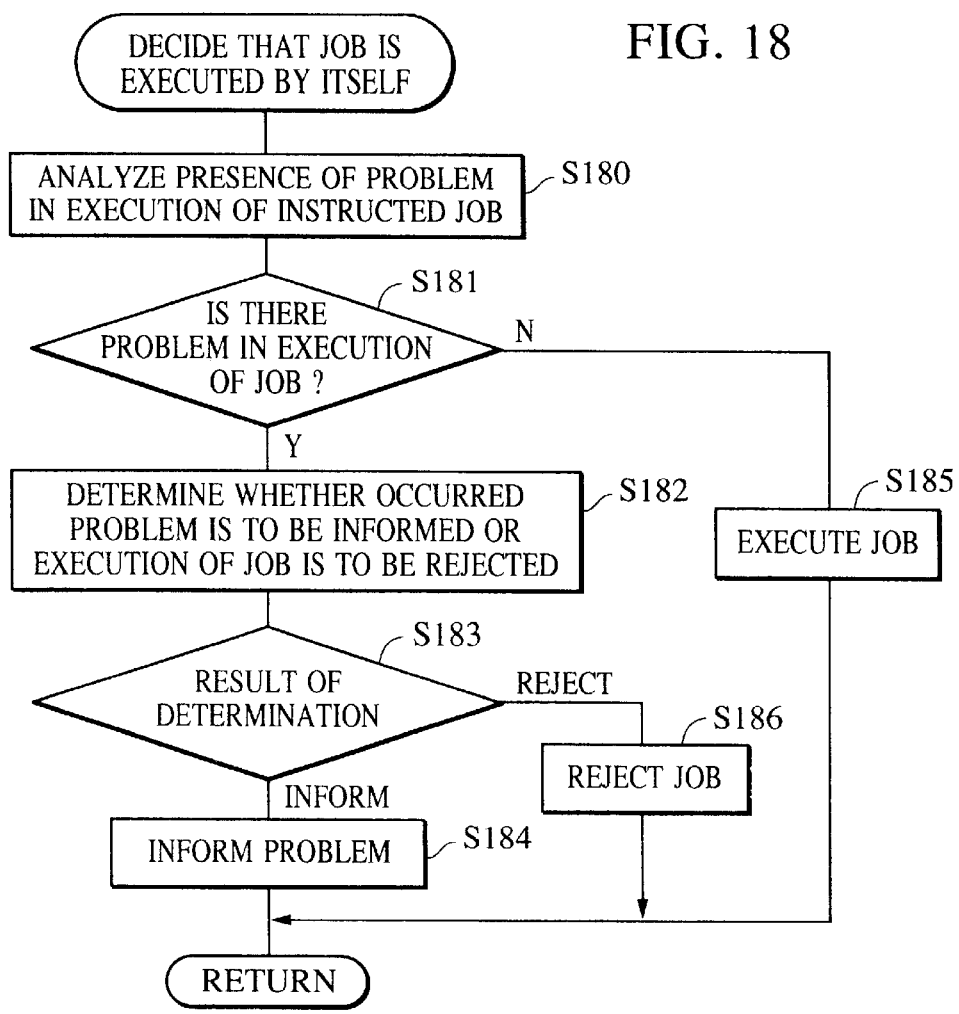
FIG. 18 is a flowchart showing a detailed sequence of JOB execution.

FIG. 18 is a flowchart showing a detailed sequence of JOB execution in such a case.

In step S180, the presence or absence of a problem in execution of the instructed JOB is analyzed. If it is determined in step S181 that there is no problem in executing the JOB, then the JOB is executed in step S185. If there is any problem, then it is determined in step S182 whether to inform the user of the occurred problem or to reject execution of the JOB. If the problem is to be conveyed to the user that is done in step S184. On the other hand, if the JOB is determined to be rejected, then the JOB is rejected in step S186 and the rejection is informed to the user.

Figure 19:
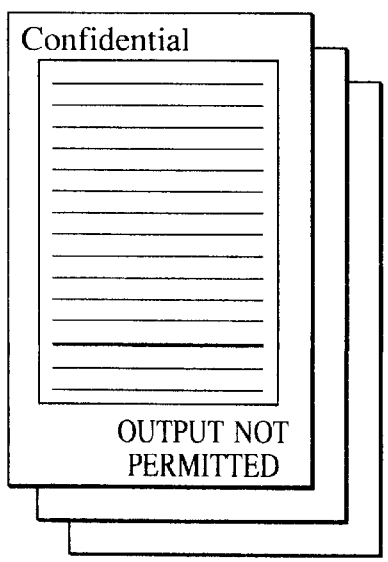
FIG. 19 is an illustration showing an example of confidential information to be read.

A case where the user of the PC 101 provides an instruction of outputting confidential information read by the scanner 102 to the printer 104 will be explained below in accordance with the flowcharts of FIGS. 15 and 18. FIG. 19 shows an example of confidential information to be read.

First, the scanner 102 receives in step S150 the JOB of scanning information and transmitting the information to the printer 104. The received JOB is added in the JOB table in step S151, and it is taken out in step S153. In step S154, the scanner 102 scans the data and grasps that the JOB is to transmit the information. The scanner 102 then determines in step S155 that it is operating normally and there is no problem in scanning and transmitting the instructed information.

In step S155, the scanner 102 understands that the JOB cannot be routed to any other apparatus. After determining in step S157 that it is optimum to execute the JOB by itself, the scanner 102 advances to step S158. The scanner 102 decides in step S158 that it scans the information by itself.

As a result of scanning the information, it is analyzed in step S180 that the document is a confidential document not permitted to output. This means that there is a problem in executing the JOB. Therefore, the scanner 102 determines in step S182 that the JOB (of scanning and outputting the information) is to be rejected. Since the rejection of the JOB is resulted in step S183, the process flow goes to step S186. In step S186, the scanner 102 conveys the rejection of the JOB to the user.

When the same system is used by a plurality of users, it is likewise possible to recognize the current user from the log-in name, etc., and reject an instruction of outputting the contents of files which belong to other users. Further, when a document is received from the exterior without resorting to an instruction from the user, it is also possible to reject output of the received document or reject issuance of a notice to inform the fact of reception if the destination user is different from the current user, or to reserve execution of the process until the destination user employs the system.

[Embodiment 11]

A process flow executed by a device instructed to execute JOB in this Embodiment 11 will be described in accordance with FIG. 4. First, in step S109, the contents of the JOB table are initialized. In step S110, it is determined whether a JOB is input or not by checking if there is a JOB input from the user or another device, etc., detectable by the system. The input analyzing JOB, for analyzing the contents of the JOB input in step S110, is added to the JOB table in step S111. Step S112 checks whether an executable JOB exists in the JOB table or not. If yes, then the executable JOB is taken out in step S113. In step S114, the instructed device grasps the object that is a background requesting the JOB to be executed.

In step S115, planning of a conceivable process is performed on the basis of the input contents, status of other devices, etc., detectable by the system, knowledge currently availability to the system, and so on. If necessary, new JOBs are added in step 5116. The process is executed in steps S117 to S119 in accordance with the procedures obtained from the planning. Those steps are repeated until no JOB exits in the JOB table, and the process flow returns to step S110 when all the JOBs have been executed.

Figure 23:
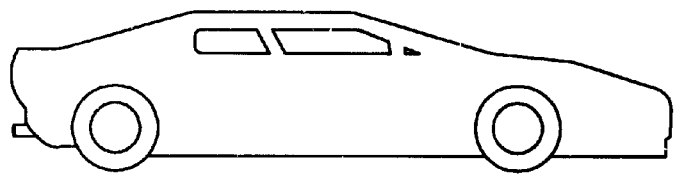
FIG. 23 is an illustration showing the contents of <file A>.

A case where the user intends to print <file A> will be described below. FIG. 23 shows the contents of <file A>, in which a picture of a car is drawn in colors. A system in this embodiment may include a PC through which the user instructs printing, a monochromatic printer as a printer to be employed usually, and a color printer connected to a network additionally.

Figures 20, 21, 22:
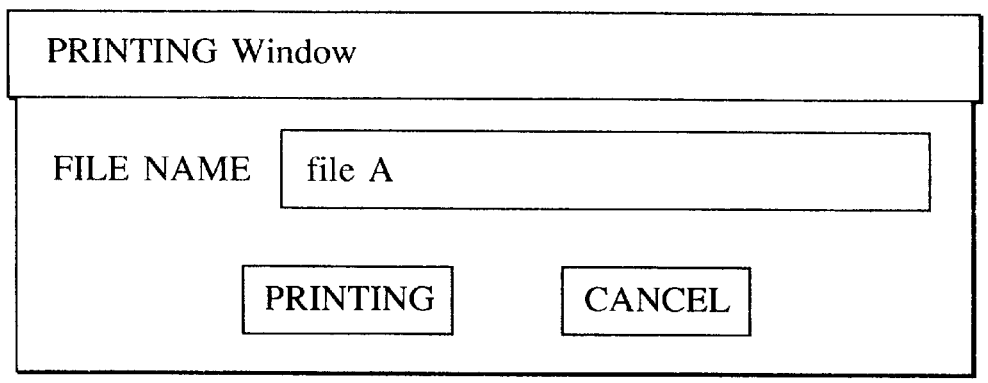
FIG. 20 is a representation showing one example of JOB tables.
FIG. 21 is a representation showing an example of Printing Window.
FIG. 22 is a representation showing another example of JOB tables.

In the monochromatic printer having received an instruction, the JOB table is initialized in step S109. In step S111, the JOB to be executed in the absence of input is added to the JOB table (FIG. 20). When the user specifies the file name <file A> and selects printing in a window indication (see FIG. 21), it is determined in step S110 that there is an input, and the process flow goes to step S111. In step S111, as shown in FIG. 22, the input analyzing JOB is added to the JOB table. Step S112 now determines that there is an executable JOB, and therefore the process flow goes to step S113. In step S113, the monochromatic printer obtains the executable JOB of analyzing an input of "printing of <file A>". In step S114, the monochromatic printer then grasps that the object of the input of "printing of <file A>" is to print <file A>.

Based on the following conditions and situations, in step S115, planning of a proposal for prompting the user to make printing by a color printer is performed:

<file A> includes a colored area (the picture of the car in FIG. 23).

there exists the usable color printer.

In step S119, an inquiry "Do you make printing by color printer? is issued to the user (FIG. 24). At the same time, the JOB of taking action in the absence of a response from the user is added to the JOB table (FIG. 25). After that, the process flow returns to step S110.

If there is no input for 10 minutes in step S110, then step S112 determines that an executable JOB exists, and therefore the process flow goes to step S113. In step S113, the monochromatic printer acquires the executable JOB of taking action in the absence of a response from the user.

In step S114, the monochromatic printer a grasps that the object of the JOB of taking action in the absence of a response from the user, is to know whether or not the user has received the proposal. Based on the following conditions and situations, in step S115, it is decided to issue an inquiry to the user over a telephone:

the phone number of the place where the user is now is known (from schedule data in FIG. 26).

printing must be executed urgently (because <file A> is to be used in a business talk from 13:00 as shown in the schedule data in FIG. 26).

In step S119, an inquiry of "Do you make printing by color printer? is telephoned to the user (FIG. 27). At the same time, a JOB of taking action in the absence of a response from the user is added to the JOB table (FIG. 28). After that, the process flow returns to step S110.

If the user says "Yes. All right." as shown in FIG. 27, then it is determined in step S110 that there is an input, and the process flow goes to step Sill. In step S111, the input analyzing JOB is added to the JOB table. Step S112 now determines that there is an executable JOB, and therefore the process flow goes to step S113. In step S113, the monochromatic printer obtains the executable JOB of analyzing an input of "Yes. All right." In step S114, the monochromatic printer then grasps that the object of the input of "Yes. All right." is to show approval of the proposal.

In step S115, the monochromatic printer decides that <file A> is to be sent to the color printer 2302 (FIG. 30) for printing. In step S118, <file A> is sent to and printed by the color printer 2302. At the same time, the JOB of confirming whether the printing has been normally ended or not, is added to the JOB table (FIG. 29). After that, the process flow returns to step S110.

If there is no input in step S110 and the printer status is changed from "under printing" to "there is printed document" as shown in FIG. 30, then step S112 determines that an executable JOB exists, and therefore the process flow goes to step S113. In step S113, the monochromatic printer acquires the executable JOB of carrying out a process corresponding to the printer status. Because the status "there is printed document" means, as seen from a printer status table of FIG. 31, that the printed document remains in a printer tray, the monochromatic printer grasps in step S114 that the JOB object is to deliver the printed document to the user.

Taking into account that the user will come to pick up the printed document soon, the monochromatic printer decides in step S115 that it will wait for the user in such a state. In step S116, the JOB of confirming whether the user has come to pick up the printed document or not, is added to the JOB table (FIG. 32). After that, the process flow returns to step S110. If there is no input in step S110 for 10 minutes and the printed document remains in the tray, then step S112 determines that an executable JOB exists, and therefore the process flow goes to step S113. In step S113, the monochromatic printer acquires the executable JOB of taking action for the case of the printed document remaining in the tray. Because the status "there is printed document" means, as seen from the printer status table of FIG. 31, that the printed document remains in the printer tray, the monochromatic printer grasps in step S114 that the JOB object is to deliver the printed document to the user. Since the printed document has been left in the printer tray for 10 minutes, the monochromatic printer decides in step S115 that the user has forgotten to pick up the printed document. In step S119, a notice "there is printed document in color printer" is sent to the user (FIG. 33). At the same time, the JOB of taking action in the absence of a response from the user and the JOB of taking action in the case of the user coming to pick up the printed document, are added its the JOB table (FIG. 34). After that, the process flow returns to step S110.

If there is no input in step S110 and the printer status is changed from "there is printed document" to "normal" as shown in FIG. 35, then step S112 determines that an executable JOB exists, and therefore the process flow goes to step S113. In step S113, the monochromatic printer acquires the executable JOB of checking (rearranging) the JOB corresponding to the printer status "there is printed document". In step S114, the monochromatic printer grasps that the JOB object of checking the JOB corresponding to the printer status "there is printed document" is to delete the JOB which has become unnecessary. Then, the monochromatic printer 2303 decides in step S115 that it to delete the JOB of waiting for a response from the user. In step S119, the JOB of waiting for a response from the user is deleted. Here, no new JOB is added. Hence the process flow returns to step S110 in the initialized state.

FIGS. 36 and 37 are tables showing rules for plans and actions.

When the user pushes the button "printing" in the Printing Window of FIG. 21, it is determined by referring to the plans and actions in the table of FIG. 36 that the user's object resides in changing the current status to "there is printed document". Since the status "there is printed document" is also a precondition for the object of "obtain printed document", the final user's object is determined as being "obtain printed document".

When the user offers an approval or opposition with voice, mouse control, etc., in response to the Question Window of FIG. 24, the Notice Window of FIG. 33, or the inquiry sent over telephone like FIG. 27, the user's object is determined as being the offering of approval or opposition to the inquiry, etc.

In FIG. 37, the final object of the system is to achieve the user's object. As a precondition for achieving the user's object, the system must be stable. Based on stability of the system, the system operates to (1) grasp the user's object, (2) make planning to achieve the object, and execute plans.

Of course, the system must be restored to the normal condition, if abnormal, for maintaining stability of the system. In addition, power is turned off when the system is not needed to operate, for the purposes of cutting down the cost and keeping the system from being brought into an unstable condition.

Figure 38:
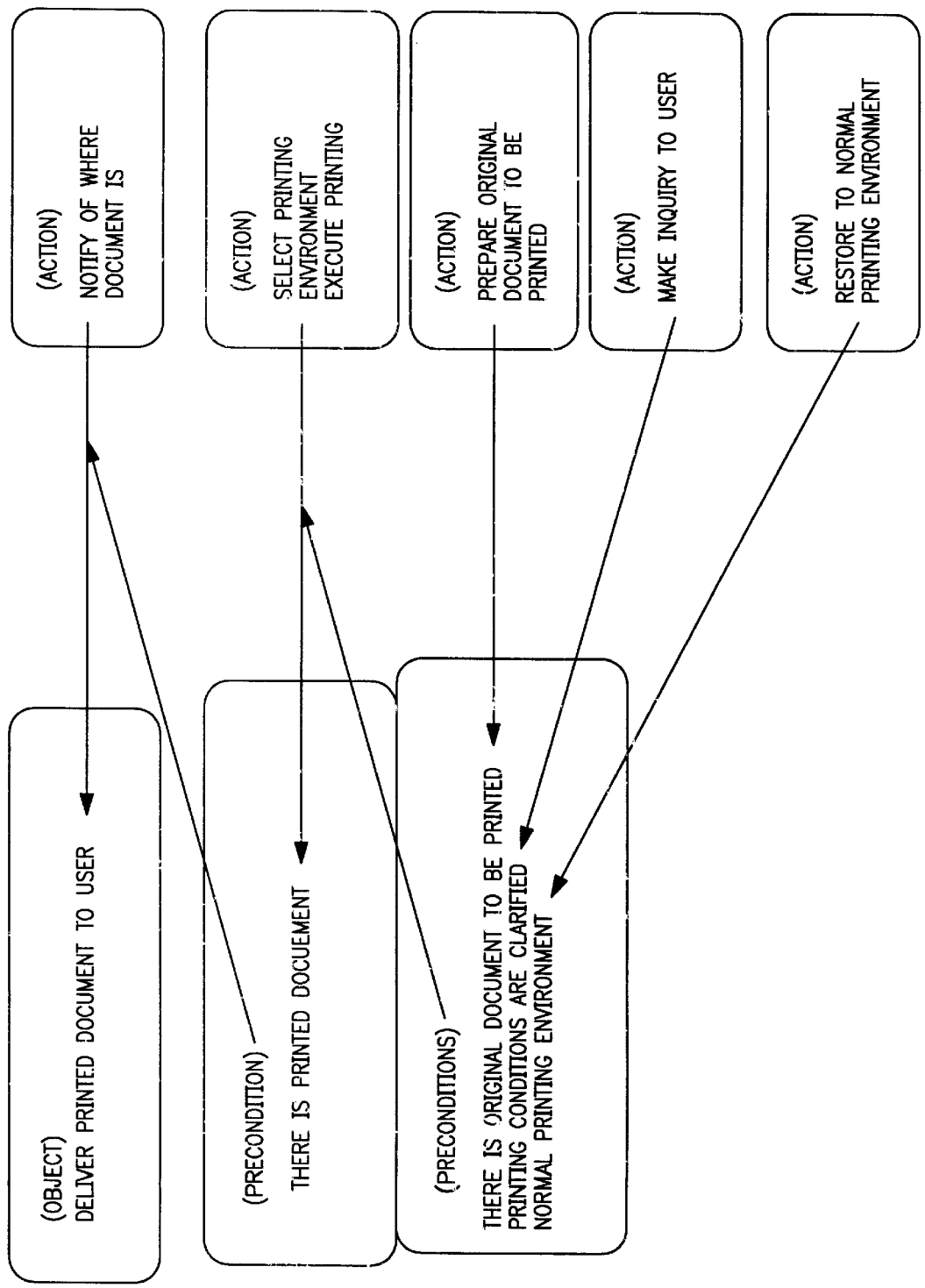
FIG. 38 is a representation showing actions and preconditions corresponding to the object.

FIG. 38 illustrates a part of FIG. 37 for easier understanding.

To grasp the user's object, if some input is applied from the user, a relevant printer grasps the input. Then, corresponding to the user's object of "obtain printed document" in FIG. 36, there exists an object of "deliver printed document to user" as the object of the system.

To deliver the printed document to the user, it is a precondition that the printed document exists. The printer tries to achieve the object by an action of notifying the user of place where the printed document is, on the basis of the above precondition. Of course, actually obtaining the document means that the user must come to pick up the document, or that the document must be delivered to the user in some way. In this embodiment, however, the fact of the printed document being taken away from the printer is determined to be equivalent to the user having obtained the document.

On the other hand, the status "there is printed document" is based on the preconditions that an original document to be printed exists, printing conditions are clarified, and corresponding printing environment is set in a normal state. Based on these preconditions, the corresponding printing environment is selected and the printing is executed. The precondition that an original document to be printed exists can be satisfied by an action of preparing the original document to be printed. The precondition that printing conditions are clarified can be satisfied by an action of inquiring the user of the conditions which are not clear. The precondition that corresponding printing environment is set in a normal state can be satisfied by an action of restoring the printing environment to the normal state if abnormal. Further, to acquire the user's intention, it is needed to make replanning if there is no response from the user for a certain time.

Properties of each device are stored in a memory inside the device itself or in a memory inside a server managing the devices. FIG. 39 shows an example of properties of each device. The status of each device is kept in the device itself and, transmitted to another device by the device actively transmitting its own status or passively responding to a request from another server.

Since the properties are specific to each device in the present system and remain unchanged, they are acquired by the other devices at the start-up of the system or when any connection in the network is changed. On the other hand, the status is acquired in the step of planning as an occasion requires or with intervals of a certain time, and then updated to be stored as status information in an internal memory.

[Embodiment 12]

This Embodiment 12 shows an example in which <file A> is to be printed as with Embodiment 11, but where the color printer is in a busy state.

First, when an input of "printing <file A>" is given, the input is added to the JOB table and the JOB object is grasped as being in printing <file A>. Assume now such conditions and situations that a document includes colors and the only usable color printer is in a busy state. Taking into account these conditions, a plan of inquiring the user of whether to wait for the printer status changing from the busy state or to print the document in monochrome is arranged. Then, a message and inquiry "Color printer is now busy. Do you wait or print it by monochromatic printer is sent to the user. If the user selects "wait", then the system is held in a standby state until the color printer is released from the busy state.

[Embodiment 13]

When an input "<file A> was changed to <file A'>" is given, the JOB object is grasped as being in updating the JOB table. In the current conditions and situations, the JOB of printing <file A> is present in the JOB table. Therefore, a plan of inquiring of the user as to whether the document to be printed is changed to <file A'> or not, is arranged. An inquiry "Do you print <file A'> instead of <file A> before correction? is sent to the user.

According to the embodiments explained above, the information processing system can relieve the burden of operation to be made by the user for achieving the purpose of a process, and can utilize the optimum one of available apparatus resources.

The object of operating various devices to realize the functions of the above embodiments can also be achieved by supplying program codes of software for realizing the function of any of the above embodiments to an apparatus connected to one of the various devices or a computer in the system, and causing a computer (or CPU and MPU) in the system or apparatus to operate the various devices in accordance with the supplied programs. Thus, such a scheme is also involved in the scope of the present invention. In the above case, the program codes read out of a storage medium serve in themselves to realize the function of any of the above-described embodiments; hence the program codes themselves and means for supplying the program codes to the computer, e.g., a storage medium storing the program codes, also constitute an aspect of the present invention.

Storage mediums for use in supplying the program codes may be, e.g., floppy disks, hard disks, optical disks, photo-magnetic disks, CD-ROMs, CD-Rs, magnetic tapes, non-volatile memory cards, and ROMs.

Also, the function of any of the above-described embodiments is realized by not only a computer alone which reads and executes the program codes, but also a computer which cooperates with an OS (Operating System) working on the computer or any other application in accordance with the program codes. In either case, those programs codes are also involved in the scope of the present invention.

Further, the present invention involves such a case where the program codes read out of the storage medium are written into a memory built in a function add-in board mounted in the computer or a function add-in unit connected to the computer, and a CPU or the like built in the function add-in board or unit executes part or whole of the actual process in accordance with instructions from the program codes, thereby realizing the function of any of the above-described embodiments.

When applying the present invention to any of the above-mentioned storage mediums, it is just required to load the program codes corresponding to the flowcharts, explained above, in the storage medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing apparatus connecting with at least one other apparatus, said information processing apparatus comprising:

receiving means for receiving information;

analyzing means for analyzing the received information;

deciding means for deciding, based on an analyzed result provided by said analyzing means, a process instructed by the user and an apparatus instructed to execute the process;

instructing means for instructing another apparatus to execute the process;

recognizing means for recognizing a situation;

determining means for determining, based on the analyzed result and the situation, whether said instructed process is to be executed by said instructed apparatus;

inquiring means for proposing an alternative plan to be substituted for the instruction from the user and issuing an inquiry to the user about the alternative plan, when said determining means determines that said instructed process is not to be executed by said instructed apparatus; and response receiving means for receiving a response from the user to said alternative plan proposed by said inquiring means.

2. An information processing apparatus according to claim 1, wherein said recognizing means recognizes situations of said at least one other apparatus connected to said apparatus.

3. An information processing apparatus according to claim 2, wherein, when said recognizing means recognizes that said instructed apparatus cannot execute said instructed process, said determining means determines said instructed process is not to be executed by said instructed apparatus.

4. An information processing apparatus according to claim 2, wherein, when said recognizing means recognizes that there is an apparatus more suitable for executing said instructed process than said instructed apparatus, said determining means determines that said instructed process is not to be executed by said instructed apparatus and said inquiring means proposes, as said alternative plan, to have said instructed process executed by said more suitable apparatus.

5. An information processing apparatus according to claim 1, wherein, when said recognizing means recognizes that there is a process more suitable than said instructed process, said determining means determines that said instructed process is not to be executed by said instructed apparatus and said inquiring means proposes, as said alternative plan, to have said more suitable process executed.

6. An information processing apparatus according to claim 1, wherein, when the response received by said response receiving means from the user for said alternative plan is an approval, said instructing means instructs a relevant apparatus to execute said alternative plan.

7. An information processing apparatus according to claim 1, wherein said inquiring means proposes a plurality of plans.

8. An information processing apparatus according to claim 2, wherein said recognizing means recognizes properties of said other apparatus.

9. An information processing apparatus according to claim 2, wherein said recognizing means recognizes current status of said other apparatus.

10. An information processing method performed by an information processing apparatus, said method comprising:

a receiving step, of receiving information;

an analyzing step, of analyzing the received information;

a deciding step, of deciding, based on an analyzed result provided by said analyzing step, a process instructed by the user and an apparatus instructed to execute the process;

a recognizing step, of recognizing a situation;

a determining step, of determining, based on said analyzed result and the situation, whether the instructed process is to be executed by the instructed apparatus;

an instructing step, of instructing the instructed apparatus to execute the instructed process when it is determined in said determining step that the instructed process is to be executed by the instructed apparatus;

an inquiring step, of proposing an alternative plan to be substituted for that instructed by the user and issuing an inquiry to the user about the alternative plan when it is determined in said determining step that the instructed process is not to be executed by the instructed apparatus; and a response receiving step, of receiving a response from the user to the alternative plan proposed in said inquiring step.

11. An information processing method according to claim 10, wherein said recognizing step includes recognizing situations of other apparatus connected to said information processing apparatus.

12. An information processing method according to claim 11, wherein, when it is recognized in said recognizing step that the instructed apparatus cannot execute the instructed process, said determining step determines that the instructed process is not to be executed by the instructed apparatus.

13. An information processing method according to claim 11, wherein, when it is recognized in said recognizing step that there is an apparatus more suitable for executing the instructed process than the instructed apparatus, then it is determined said determining step that the instructed process is not to be executed by the instructed apparatus, and in said inquiring step it is proposed, as the alternative plan, to have the instructed process executed by the more suitable apparatus.

14. An information processing method according to claim 10, wherein, when it is recognized in said recognizing step that there is a process more suitable than the instructed process, then it is determined in said determining step that the instructed process is not to be executed by the instructed apparatus, and in said inquiring step it is proposed, as the alternative plan, to execute the more suitable process.

15. An information processing method according to claim 10, wherein, when the response received in said response receiving step from the user for the alternative plan is an approval, then in said instructing step a relevant apparatus is instructed to execute the alternative plan.

16. An information processing method according to claim 10, wherein said inquiring step includes proposing a plurality of plans.

17. An information processing method according to claim 11, wherein said recognizing step recognizes properties of said other apparatus.

18. An information processing method according to claim 11, wherein said recognizing step recognizes current status of said other apparatus.

19. A computer-readable storage medium storing an information processing program for controlling a computer to perform information processing, said program comprising codes for causing said computer to perform:

a receiving step, of receiving information;

an analyzing step, of analyzing the receiving information;

a deciding step, of deciding, based on an analyzed result provided by said analyzing step, a process instructed by the user and an apparatus instructed to execute the process;

a recognizing step, of recognizing a situation;

a determining step, of determining, based on the analyzed result and the situation, whether the instructed process is to be executed by the instructed apparatus;

an instructing step, of instructing the instructed apparatus to execute the instructed process when it is determined in said determining step that the instructed process is to be executed by the instructed apparatus;

an inquiring step, of proposing an alternative plan to be substituted for the instruction from the user and issuing an inquiry to the user about the alternative plan, when it is determined in said determining step that the instructed process is not to be executed by the instructed apparatus; and a response receiving step, of receiving a response from the user for the alternative plan proposed in said inquiring step.

20. An information processing apparatus according to claim 4, wherein, when said instructed process is a printing of a color document and said instructed apparatus is a monochrome printer, said recognizing means recognizes that a color printer is more suitable for executing said instructed process.

21. An information processing method according to claim 13, wherein, when the instructed process is a printing of a color document and the instructed apparatus is a monochrome printer, then it is recognized in said recognizing step that a color printer is more suitable for executing the instructed process.

22. An information processing apparatus connecting with at least one other apparatus, said information processing apparatus comprising:

a receiver, arranged to receive information;

an analyzer, that receives and analyzes the received information;

a decision unit that receives the analysis result provided by said analyzer and, based on the analysis result, decides a process instructed by the user and selects an apparatus to execute the process;

an inquiry unit, that proposes to the user the apparatus selected to execute the process and issues an inquiry to the user about the selected apparatus; and a response receiver arranged to receive a response from the user to the inquiry.

23. An information processing apparatus according to claim 22, wherein, when the response received by said response receiver from the user is an approval, said instructing unit instructs the selected apparatus to execute the process.

24. An information processing apparatus according to claim 22, wherein said decision unit selects a plurality of apparatus, and said inquiry unit proposes the plurality of apparatus to the user for selection of one apparatus by the user.

25. An information processing method performed by an information processing apparatus, said method comprising the steps of:

receiving information;

analyzing the received information;

based on an analysis result obtained in said analyzing step, deciding a process instructed by the user and selecting an apparatus to execute the process;

proposing to the user the apparatus selected to execute the process and issuing an inquiry to the user about the selected apparatus; and receiving a response from the user to the inquiry.

26. An information processing method according to claim 25, further comprising the step of, when the response received in said response receiving step from the user is an approval, instructing the selected apparatus to execute the process.

27. An information processing method according to claim 25, wherein, in said deciding step, a plurality of apparatus are selected, and in said inquiring step, the plurality of apparatus are proposed to the user for selection of one apparatus by the user.

* * * * *

UNITED STATES PATENT AND TRADEMARK OFFICE
CERTIFICATE OF CORRECTION

PATENT NO.    : 6,317,823 B1
DATED         : November 13, 2001
INVENTOR(S)   : Masanori Wakai et al.

It is certified that error appears in the above-identified patent and that said Letters Patent is hereby corrected as shown below:

<u>Title page,</u>
Item [56], References Cited, U.S. PATENT DOCUMENTS, "Martin" should read -- Lobiondo --.

<u>Drawings,</u>
Sheet 10, FIG. 11, "ADMINSTRATOR" should read -- ADMINISTRATOR --.
Sheet 26, FIG. 37, "DELIVER TO" should read -- DELIVER --.

<u>Column 1,</u>
Line 59, "for" should be deleted.

<u>Column 3,</u>
Line 65, "execute" should read -- executes --; and
Line 67, "another" should read -- other --.

<u>Column 4,</u>
Line 38, "portion 207" should read -- portion 205 --;
Line 43, "portion 206" should read -- portion 207 --;
Line 47, "portion 205" should read -- portion 208 --;
Line 50, "that" should read -- that, --;
Line 54, "A" should read -- An --;
Line 55, "An" should read -- A --;
Line 67, "the" should be deleted.

<u>Column 5,</u>
Line 22, "in puts" should read -- inputs --.

<u>Column 7,</u>
Line 31, "printing." should read -- printing, and --;
Line 46, "locating" should read -- located --; and
Line 52, "locating" should read -- located --.

<u>Column 8,</u>
Line 39, "cancel" should read -- cancels --.

<u>Column 11,</u>
Line 57, "JOB to," should read -- JOB, to --.

<u>Column 12,</u>
Line 66, "availability" should read -- available --; and
Line 67, "step 5116." should read -- step S116. --.

UNITED STATES PATENT AND TRADEMARK OFFICE
CERTIFICATE OF CORRECTION

PATENT NO. : 6,317,823 B1
DATED : November 13, 2001
INVENTOR(S) : Masanori Wakai et al.

It is certified that error appears in the above-identified patent and that said Letters Patent is hereby corrected as shown below:

Column 13,
Line 32, "printer?" should read -- printer?" --;
Line 41, "a" should be deleted;
Line 54, "printer?" should read -- printer?" --;
Line 60, "step Sill." should read -- step S111. --; and
Line 65, "right."" should read -- right.". --.

Column 14,
Line 57, "2303" should be deleted, and "it" should read -- it is --.

Column 15,
Line 15, "and" should read -- and (3) --; and
Line 61, "and," should read -- and is --.

Column 16,
Line 16, "printer" should read -- printer? --; and
Line 27, "correction?" should read -- correction?" --.

Column 18,
Line 45, "said" should read -- in said --.

Column 19,
Line 9, "receiving" should read -- received --.

Signed and Sealed this

Thirteenth Day of August, 2002

*Attest:*

JAMES E. ROGAN
*Attesting Officer*   *Director of the United States Patent and Trademark Office*